(12) United States Patent
Dematapitiya

(10) Patent No.: US 9,652,325 B2
(45) Date of Patent: May 16, 2017

(54) STORAGE SYSTEM AND METHOD TO SUPPORT SCHEDULED AND OPERATIONAL GOING DOWN OF A STORING UNIT

(75) Inventor: Sumudu Dematapitiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 362 days.

(21) Appl. No.: 13/522,886

(22) PCT Filed: Aug. 25, 2010

(86) PCT No.: PCT/JP2010/005216
§ 371 (c)(1),
(2), (4) Date: Jul. 18, 2012

(87) PCT Pub. No.: WO2011/092760
PCT Pub. Date: Aug. 4, 2011

(65) Prior Publication Data
US 2012/0297154 A1    Nov. 22, 2012

(30) Foreign Application Priority Data

Jan. 26, 2010    (JP) .................................. 2010-013890

(51) Int. Cl.
*G06F 12/02*    (2006.01)
*G06F 11/10*    (2006.01)
(Continued)

(52) U.S. Cl.
CPC ........ *G06F 11/1092* (2013.01); *G06F 3/0689* (2013.01); *G06F 11/2094* (2013.01);
(Continued)

(58) Field of Classification Search
CPC .... G06F 3/0689; G06F 11/08; G06F 11/1076; G06F 11/1092; G06F 11/1088
See application file for complete search history.

(56) References Cited

U.S. PATENT DOCUMENTS 5,680,539 A * 10/1997 Jones .......................... 714/6.21
5,727,144 A *  3/1998 Brady et al. ................. 714/6.12
(Continued)

FOREIGN PATENT DOCUMENTS

JP    2000200157 A  *  7/2000
JP    2005-235171 A    9/2005
(Continued)

OTHER PUBLICATIONS

JP2000200257A.pdf—Machine translation of Japan Patent Publication, JP 2000200157 A, dated on Jul. 18, 2000, from Japanese to English.*
(Continued)

*Primary Examiner* — Charles Rones
*Assistant Examiner* — Tian-Pong Chang
(74) *Attorney, Agent, or Firm* — Sughrue Mion, PLLC

(57) ABSTRACT

There are provided: a distribution storage processing unit for distributing and storing a plurality of fragment data including division data obtained by dividing storage target data into a plurality of pieces and redundant data into a plurality of storing unit; an operation status detecting unit for detecting operation statuses of the respective storing unit; and a data regenerating unit for, in accordance with a result of the detection by the operation status detecting unit, when any of the storing unit goes down, regenerating the fragment data having been stored in the down storing unit based on the other fragment data stored in the other storing unit different from the down storing unit. Moreover, the data regenerating unit has a function of transferring and storing the fragment data stored in the storing unit previously scheduled to go down into the other storing unit before the storing unit goes down.

7 Claims, 17 Drawing Sheets

(51) Int. Cl.
*G06F 3/06* (2006.01)
*G06F 11/20* (2006.01)
*G06F 11/08* (2006.01)

(52) U.S. Cl.
CPC .......... *G06F 11/08* (2013.01); *G06F 11/1076* (2013.01); *G06F 11/1088* (2013.01)

(56) References Cited

U.S. PATENT DOCUMENTS

| | | | |
|---|---|---|---|
| 6,516,425 B1* | 2/2003 | Belhadj et al. | 714/6.12 |
| 6,625,748 B1* | 9/2003 | Tanaka et al. | 714/6.12 |
| 6,799,283 B1* | 9/2004 | Tamai et al. | 714/6.12 |
| 6,996,742 B2* | 2/2006 | Lerman et al. | 714/6.22 |
| 7,685,463 B1* | 3/2010 | Linnell | 714/5.1 |
| 2003/0167439 A1* | 9/2003 | Talagala et al. | 714/770 |
| 2004/0260967 A1* | 12/2004 | Guha et al. | 714/3 |
| 2007/0220313 A1 | 9/2007 | Katsuragi et al. | |
| 2008/0005469 A1* | 1/2008 | Pherson et al. | 711/114 |
| 2009/0241100 A1 | 9/2009 | Sakurai et al. | |
| 2010/0031082 A1* | 2/2010 | Olster | 714/7 |
| 2011/0264854 A1* | 10/2011 | Ouchi | 711/114 |

FOREIGN PATENT DOCUMENTS

| | | |
|---|---|---|
| JP | 2007-233903 A | 9/2007 |
| JP | 2008-204206 A | 9/2008 |
| JP | 2009-211349 A | 9/2009 |
| JP | 2009-230577 A | 10/2009 |

OTHER PUBLICATIONS

International Search Report of PCT/JP2010/005216, dated Sep. 28, 2010.
Communication dated Feb. 25, 2014, issued by the Japanese Patent Office in corresponding Application No. 2010-013890.

* cited by examiner

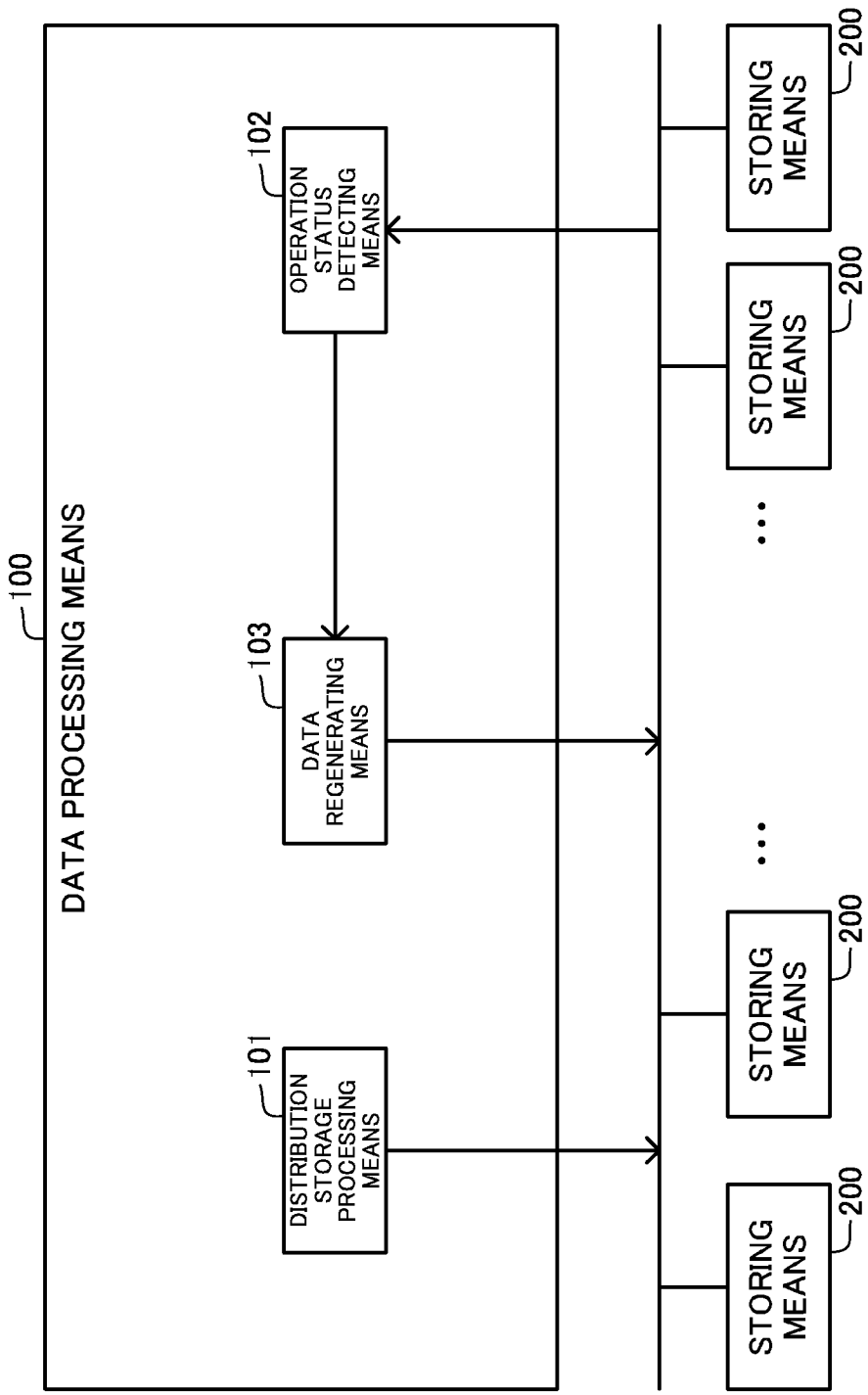

STORAGE SYSTEM AND METHOD TO SUPPORT SCHEDULED AND OPERATIONAL GOING DOWN OF A STORING UNIT

CROSS REFERENCE TO RELATED APPLICATIONS

This application is a National Stage of International Application No. PCT/JP2010/005216 filed Aug. 25, 2010, claiming priority based on Japanese Patent Application No. 2010-13890 filed Jan. 26, 2010, the contents of all of which are incorporated herein by reference in their entirety.

TECHNICAL FIELD

The present invention relates to a storage system, more specifically, relates to a storage system that distributes and stores data into a plurality of storage devices.

BACKGROUND ART

In recent years, various kinds of information are digitalized with development and spread of computers. As a device for storing such digital data, there is a storage device such as a magnetic tape and a magnetic disk. Since the amount of data to be stored increases day by day and reaches a huge amount, a mass storage system is required. Moreover, as well as reduction of the cost spent for a storage device, reliability is also required. In addition, it is also required that data can be easily retrieved later. As a result, a storage system that can automatically realize increase of storage capacity and performance, eliminates duplicated storage to reduce a storage cost and has high redundancy is desired.

Under such a circumstance, in recent years, as shown in Patent Document 1, a content address storage system has been developed. This content address storage system distributes and stores data into a plurality of storage devices and, by a unique content address specified depending on the content of the data, specifies a storage position where the data is stored.

To be specific, a content address storage system divides predetermined data into a plurality of fragments and adds a fragment as redundant data, and then stores these fragments into a plurality of storage devices, respectively. Later, it is possible to designate a content address to retrieve data, namely, fragments stored in a storage position specified by the content address and restore the predetermined data before being divided from the fragments.

Further, the content address is generated so as to be unique depending on the content of data. Therefore, in the case of duplicated data, it is possible to refer to data in the same storage position and acquire data having the same content. Consequently, it is unnecessary to store the duplicated data separately, and it is possible to eliminate duplicated recording and reduce the data capacity.

Further, in the storage system as described above, when a failure occurs in a storage node that stores data and the storage node is separated from the system, components on the storage node are regenerated on other storage nodes. That is to say, because the storage system described above divides predetermined data into a plurality of fragments and adds a fragment as redundant data thereto, it is possible even if a predetermined fragment among the fragments is lost to restore the data based on the other fragments.

Here, with reference to FIGS. 1 and 2, a process of regenerating data stored in a storage node when a failure occurs in the storage node will be described.

At first, as shown on the upper side of FIG. 1, in a storage system 300 equipped with a plurality of storage nodes 401 to 404, fragment data obtained by dividing storage target data are distributed and stored into respective components 1 to 12 formed on the storage nodes 401 to 404, respectively. When a predetermined storage node goes down in this state, a process of regenerating lost fragments based on the fragments stored in the remaining storage nodes is immediately started.

To be specific, in the regeneration process, firstly, the components 10, 11 and 12 storing data formed on the down storage node 404 are regenerated on the operating storage nodes 401 to 403 as shown on the lower side of FIG. 1. Then, as shown on the upper side of FIG. 2, by loading the fragments 1 to 9 stored in the operating storage nodes 401 to 403, regenerating data D stored in the down storage node 404 based on the data and dividing the data D again, the lost fragments are regenerated. After that, as shown on the lower side of FIG. 2, the regenerated fragments are distributed and stored into the newly generated components 10, 11 and 12, namely, into the operating storage nodes 401 to 403, respectively. Until these processes are completed, part of the data cannot be accessed.

Further, in the storage system as described above, when a storage node disconnected from the system recovers, recovery of data from the other storage nodes to the recovered storage node is immediately started. Here, with reference to FIG. 3, a data recovery process when a node recovers will be described.

At first, when the down storage node 404 recovers, the components 10, 11 and 12 having belonged to the recovered storage node 404 are returned to the original positions as shown on the upper side of FIG. 3 and, after that, transfers the data to the recovered storage node 404 from the storage nodes 401 to 403 as shown on the lower side of FIG. 3.

Because fragments having been stored before the recovered storage node 404 goes down already exist in the components returned to the storage node 404 in the state shown on the upper side of FIG. 3, it is enough to transfer only data newly stored into the components generated in the other storage nodes after the storage node has gone down. Therefore, the data in the storage nodes 401 to 403 are compared with the data in the storage node 404, and only a difference therebetween is transferred. For example, for lessening the process of comparing the data, only metadata configured by hash values or the like of the data are compared.

Accordingly, by using the fragments existing in the recovered storage node 404 and transferring only fragments of the data newly written in while the storage node 404 is down, it is possible to omit unnecessary data transfer.

When the down storage node recovers before the fragment regeneration process started because the storage node has gone down is completed, regeneration of the data to the other storage nodes is not all completed. However, since the data fragments being regenerated have originally existed in the down node, the recovery process is not influenced. Moreover, when loading of data is requested before completion of data transfer from the other storage nodes executed when the down storage node recovers, it is enough to load the fragments from the storage nodes of transfer destinations.

[Patent Document 1] Japanese Unexamined Patent Application Publication No. 2005-235171

[Patent Document 2] Japanese Unexamined Patent Application Publication No. 2008-204206

However, in the storage system described above, when one of the storage nodes is disconnected, data in the storage node is immediately regenerated in the other storage nodes regardless of the cause of the disconnection or a prospect for recovery of the status, and hence, the system has heady load. Moreover, when the down storage node recovers, a process of recovering data from the other storage nodes is unconditionally performed, and hence, the system has load.

To be specific, even when a storage node cannot be viewed as a result of a predictable operation such as maintenance, data regeneration is started after the operation starts, with the result that the system has load and the performance thereof deteriorates. Moreover, when a failure occurs simultaneously with a time that the data regeneration is performed, there is a risk of occurrence of data loss. Furthermore, even when a storage node is, for example, restarted because of a temporary cause and the storage node cannot be viewed, recovery of data stored in the storage node is immediately performed, with the result that the system has load and the performance thereof deteriorates. Besides, when a failure such as frequent restart of a storage node due to hardware malfunction or the like occurs, the regeneration process, the data recovery and so on are repeatedly and frequently performed, with the result that a problem that the system becomes unstable arises.

SUMMARY

Accordingly, an object of the present invention is to solve the abovementioned problems: increase of load and deterioration of performance of a storage system.

In order to achieve the object, a storage system according to an exemplary embodiment of the present invention includes a plurality of storing means and a data processing means for storing data into the plurality of storing means and retrieving the data stored in the storing means.

The data processing means includes:

a distribution storage processing means for distributing and storing a plurality of fragment data including division data obtained by dividing storage target data into a plurality of pieces and redundant data for restoring the storage target data, into the plurality of storing means;

an operation status detecting means for executing detection of an operation status of each of the storing means; and a data regenerating means for, in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means.

Further, the data regenerating means has a function of transferring and storing the fragment data stored in the storing means previously scheduled to go down into another of the storing means before the storing means scheduled to go down goes down.

Further, an information processing device according to another exemplary embodiment of the present invention is a device that is connected to a plurality of storing means and that stores data into the plurality of storing means and retrieves the data stored in the storing means.

The information processing device includes:

a distribution storage processing means for distributing and storing a plurality of fragment data including division data obtained by dividing storage target data into a plurality of pieces and redundant data for restoring the storage target data, into the plurality of storing means;

an operation status detecting means for executing detection of an operation status of each of the storing means; and a data regenerating means for, in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means.

Further, the data regenerating means has a function of transferring and storing the fragment data stored in the storing means previously scheduled to go down into another of the storing means before the storing means scheduled to go down goes down.

Further, a program according to another exemplary embodiment of the present invention is a computer program comprising instructions for causing an information processing device that is connected to a plurality of storing means and that stores data into the plurality of storing means and retrieves the data stored in the storing means, to realize:

a distribution storage processing means for distributing and storing a plurality of fragment data including division data obtained by dividing storage target data into a plurality of pieces and redundant data for restoring the storage target data, into the plurality of storing means;

an operation status detecting means for executing detection of an operation status of each of the storing means; and a data regenerating means for, in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means, and transferring and storing the fragment data stored in the storing means previously scheduled to go down into another of the storing means before the storing means goes down.

Further, an information processing method according to another exemplary embodiment of the present invention is an information processing method in an information processing device that is connected to a plurality of storing means and that stores data into the plurality of storing means and retrieves the data stored in the storing means.

The information processing method includes:

distributing and storing a plurality of fragment data including division data obtained by dividing storage target data into a plurality of pieces and redundant data for restoring the storage target data, into the plurality of storing means;

executing detection of an operation status of each of the storing means;

in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means; and includes transferring and storing the fragment data stored in the storing means previously scheduled to go down into another of the storing means before the storing means goes down.

With the configurations described above, the present invention can limit processing load and achieve increase of performance while maintaining the reliability of the storage system.

BRIEF DESCRIPTION OF DRAWINGS

FIG. 17 is a function block diagram showing a configuration of a storage system of the present invention.

EXEMPLARY EMBODIMENTS

First Exemplary Embodiment

Figure 4:
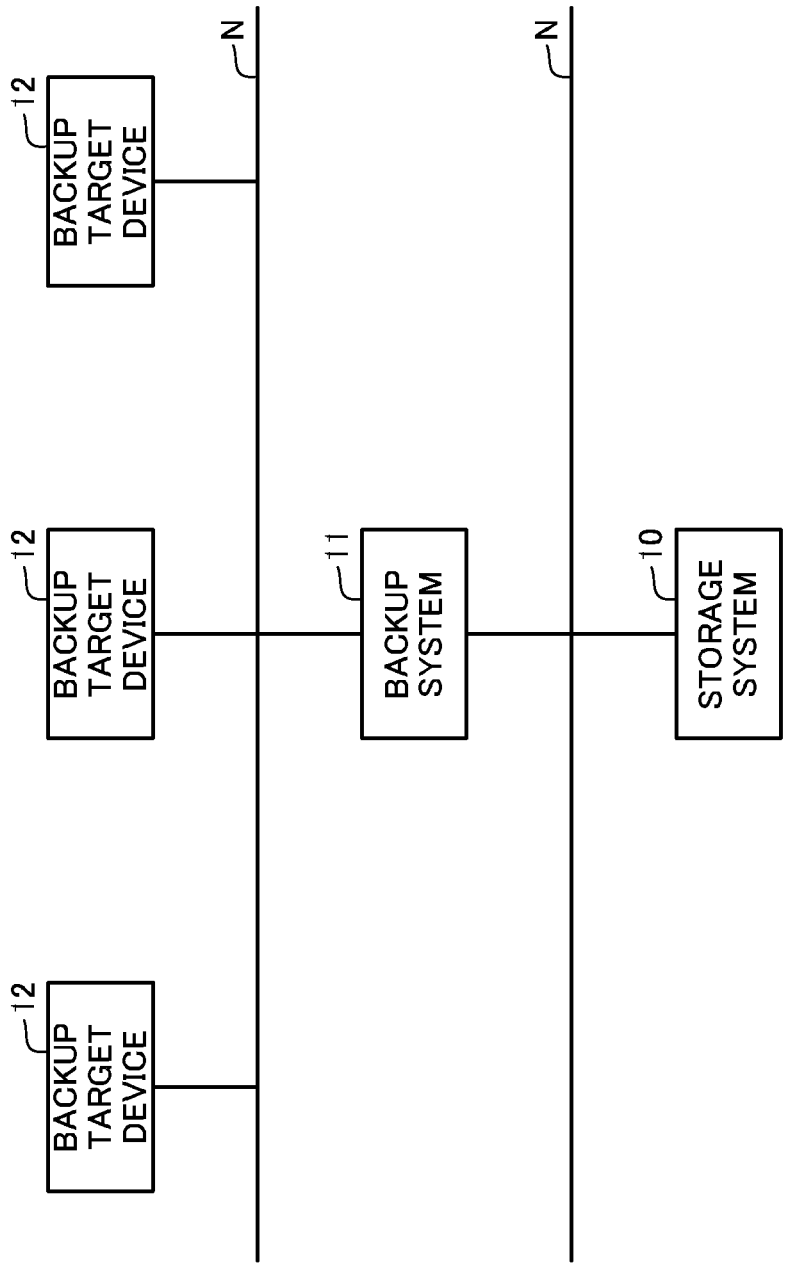
FIG. 4 is a block diagram showing a configuration of a whole system in a first exemplary embodiment of the present invention.
Figure 5:
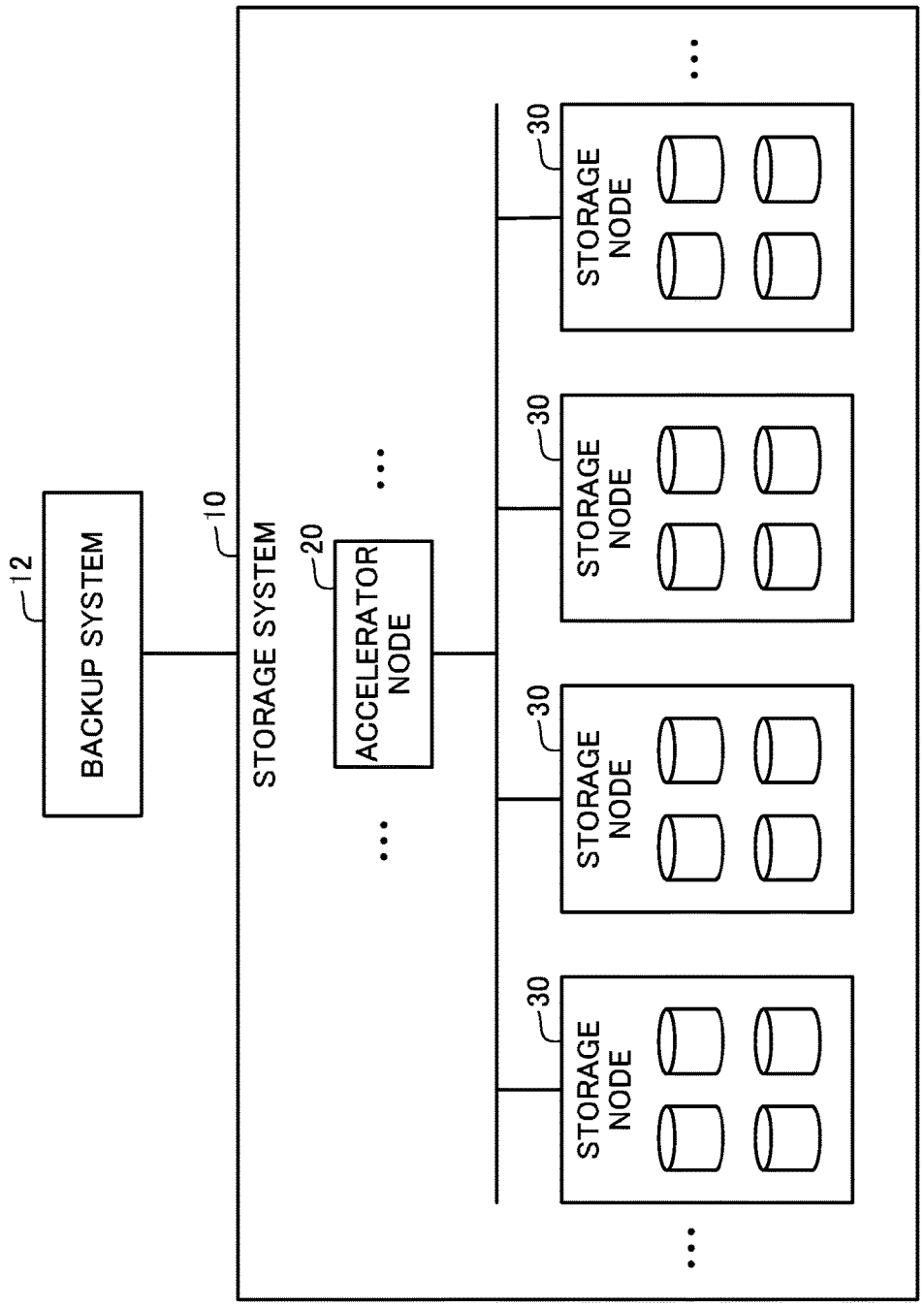
FIG. 5 is a block diagram showing the outline of a configuration of the storage system disclosed in FIG. 4.
Figure 6:
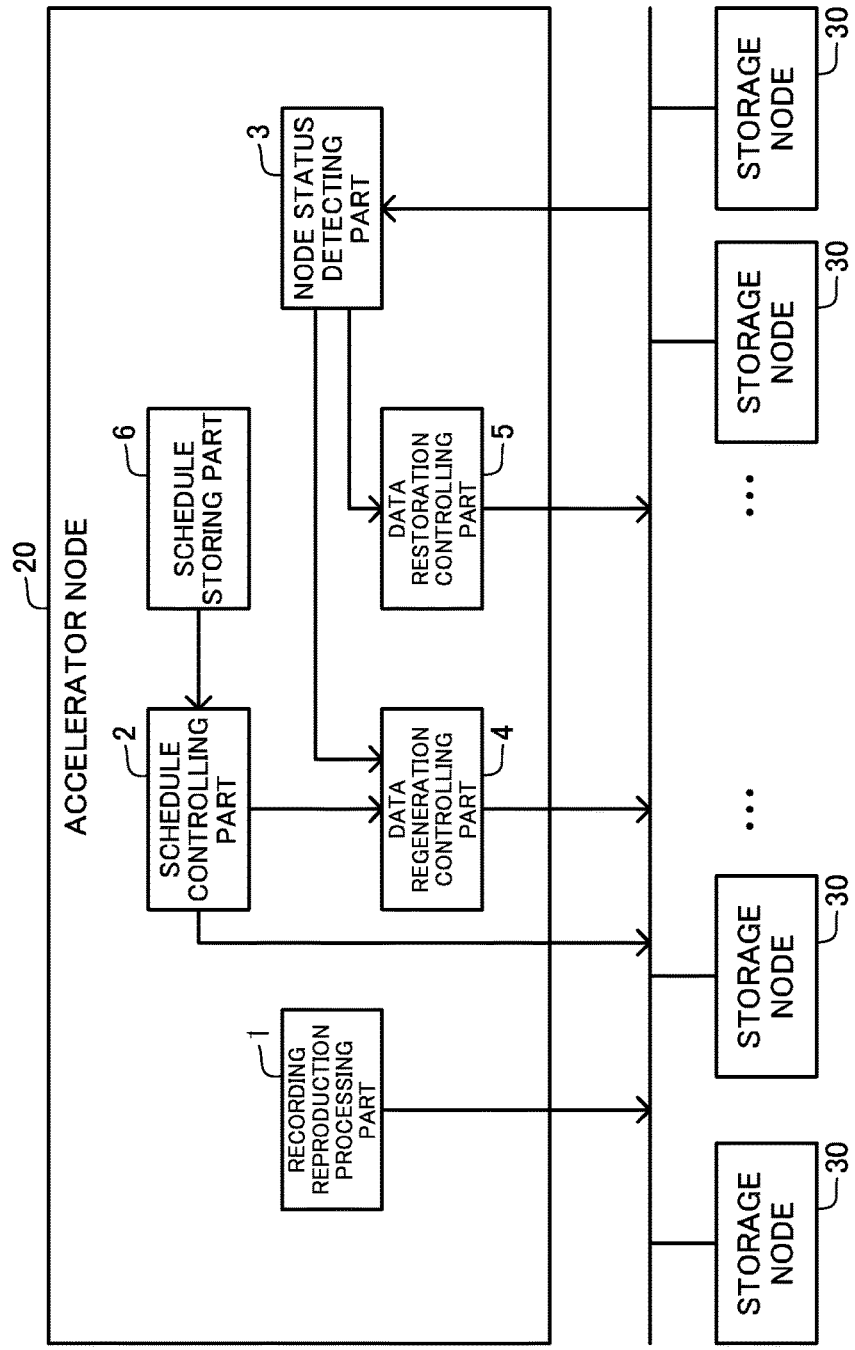
FIG. 6 is a function block diagram showing a configuration of the storage system disclosed in FIG. 5.
Figure 7:
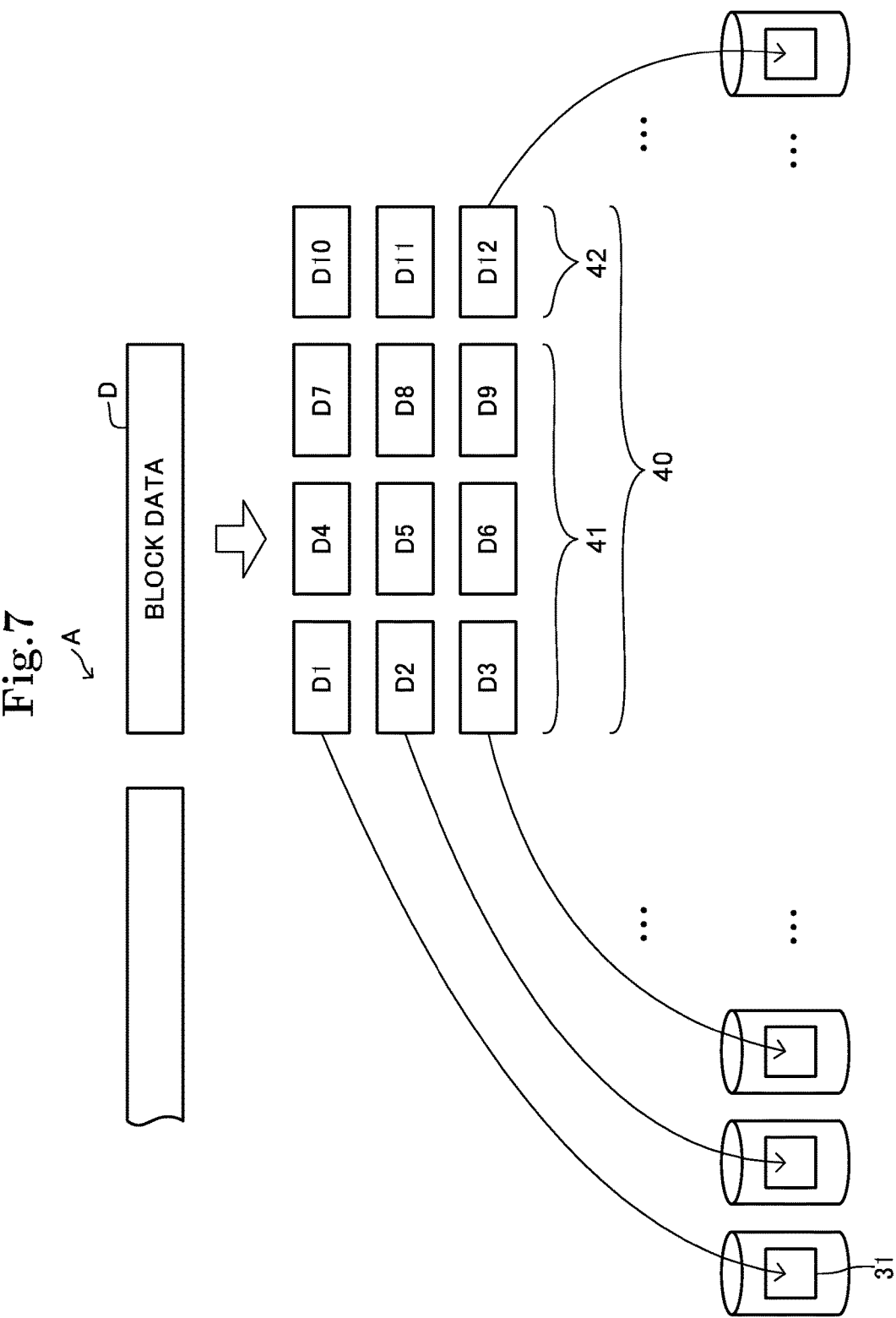
FIG. 7 is an explanation view for explaining an operation of the storage system disclosed in FIG. 6.
Figure 8:
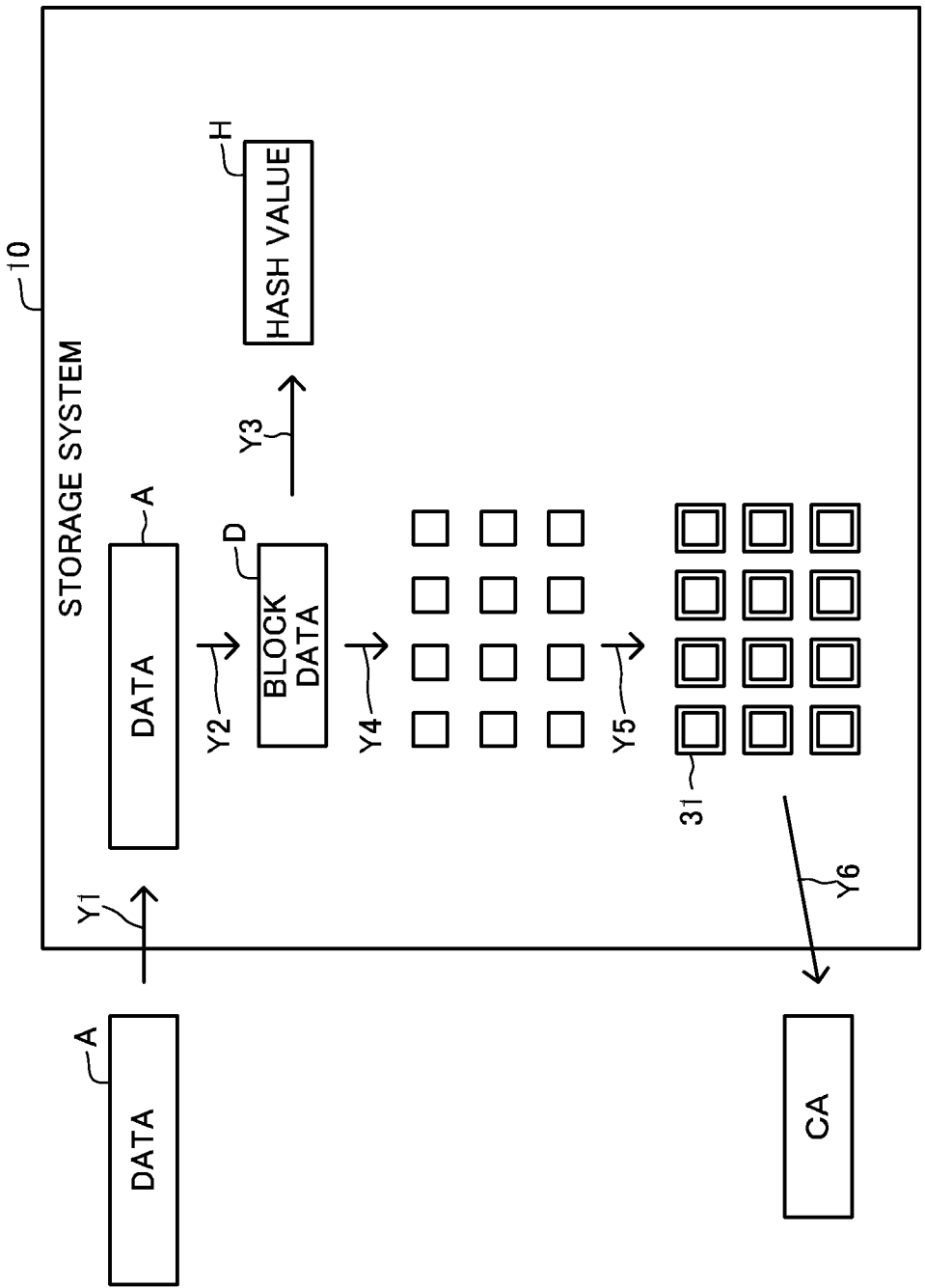
FIG. 8 is an explanation view for explaining an operation of the storage system disclosed in FIG. 6.
Figure 9:
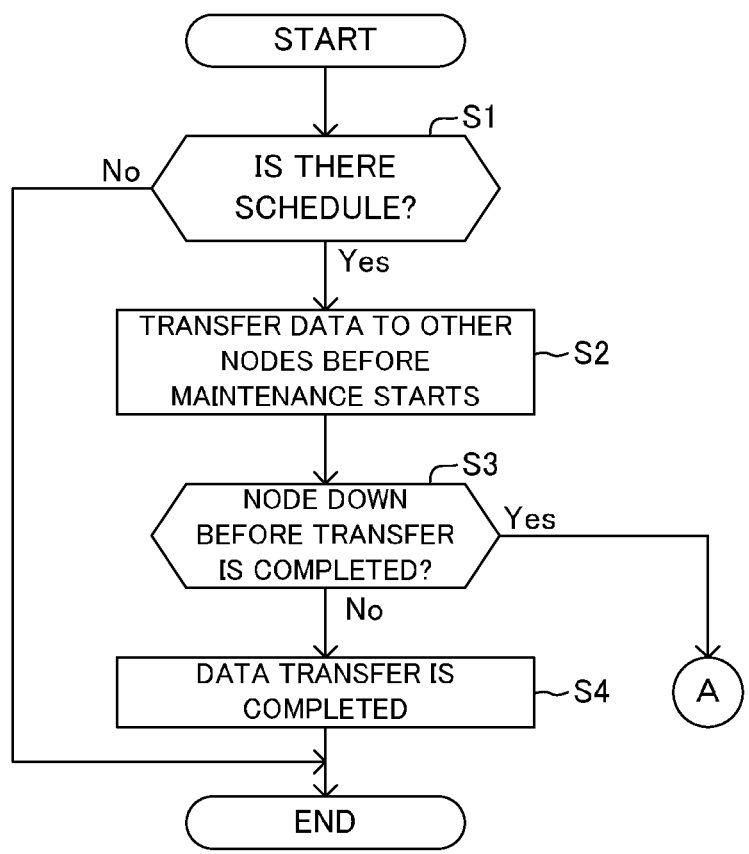
FIG. 9 is a flowchart showing an operation of the storage system disclosed in FIG. 6.
Figure 10:
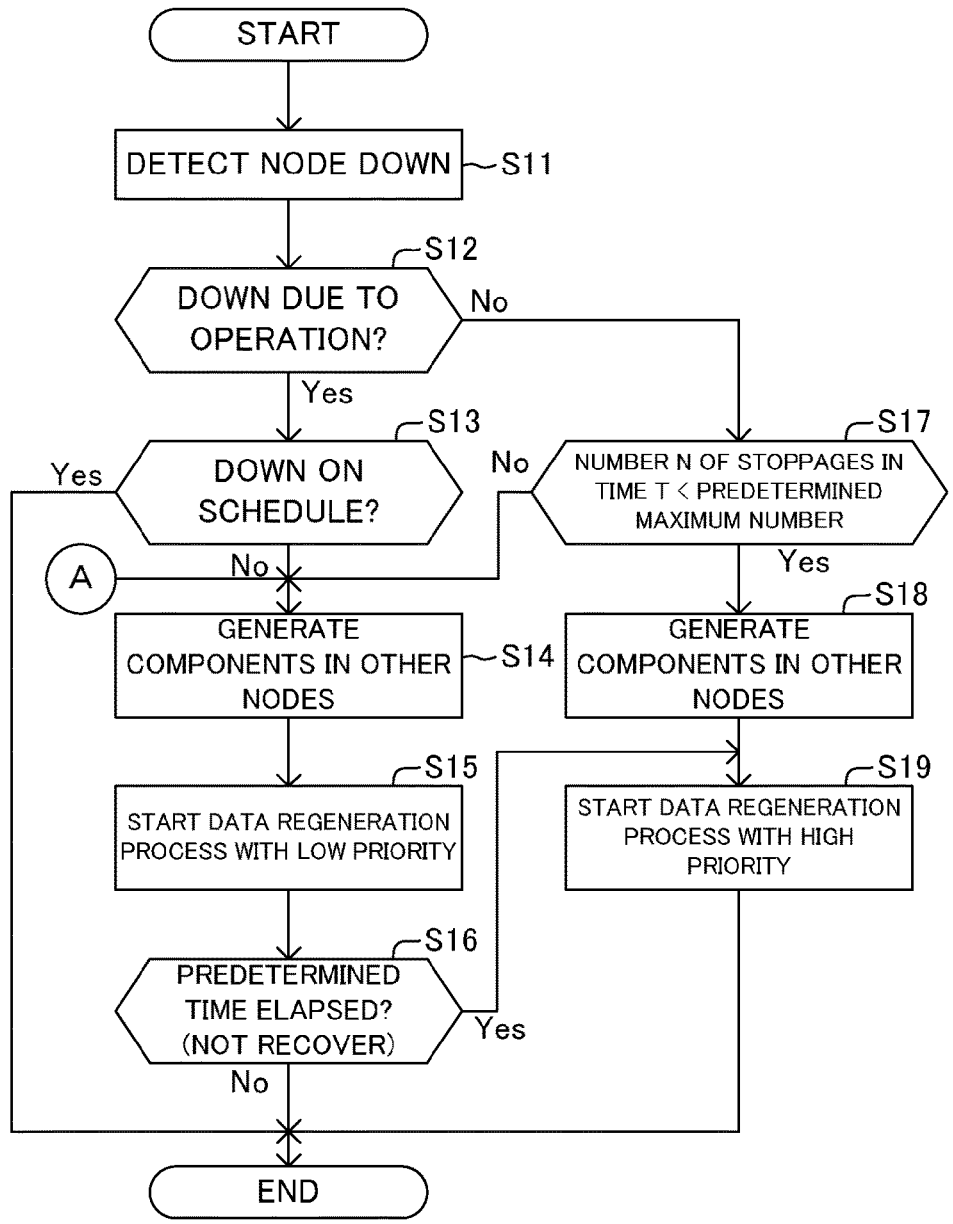
FIG. 10 is a flowchart showing an operation of the storage system disclosed in FIG. 6.
Figure 11:
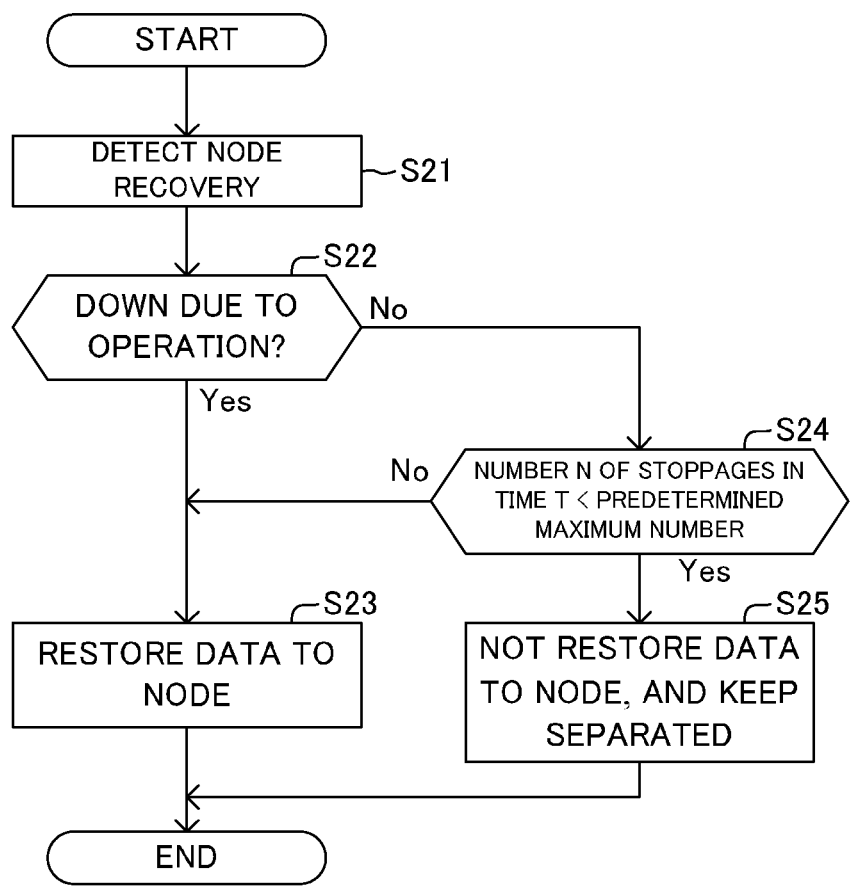
FIG. 11 is a flowchart showing an operation of the storage system disclosed in FIG. 6.

A first exemplary embodiment of the present invention will be described with reference to FIGS. 4 to 16. FIG. 4 is a block diagram showing a configuration of a whole system. FIG. 5 is a block diagram showing the outline of the storage system, and FIG. 6 is a function block diagram showing a detailed configuration of the storage system. FIGS. 7 and 8 are explanation views for explaining a basic operation of the storage system. FIGS. 9 to 11 are flowcharts showing an operation of the storage system. FIGS. 12 to 16 are explanation views for explaining an operation of the storage system.

In this exemplary embodiment, a case of configuring the storage system by connecting a plurality of server computers will be described. However, the storage system according to the present invention is not limited to be configured by a plurality of computers, and may be configured by one computer.

[Configuration]

As shown in FIG. 4, a storage system 10 according to the present invention is connected to a backup system 11 that controls a backup process via a network N. Then, the backup system 11 acquires backup target data stored in a backup target device 12 connected via the network N, and requests the storage system 10 to store the data. Consequently, the storage system 10 stores the backup target data requested to be stored, as a backup.

Then, as shown in FIG. 5, the storage system 10 of this exemplary embodiment employs a configuration in which a plurality of server computers are connected. To be specific, the storage system 10 is equipped with an accelerator node 20 that is a server computer controlling a storage reproduction operation in the storage system 10, and a storage node 30 that is a server computer equipped with a storage device for storing data. The number of the accelerator node 20 and the number of the storage node 30 are not limited to those shown in FIG. 4, and the system may be configured by connecting more nodes 20 and more nodes 30.

Furthermore, the storage system 10 in this exemplary embodiment is a content address storage system that divides data and makes the data redundant to distribute and store the data into a plurality of storage devices and, by a unique content address set depending on the content of the stored data, specifies a storage position in which the data is stored. This content address storage system will be described in detail later.

FIG. 6 shows a configuration of the storage system 10. At first, as shown in this diagram, the accelerator node 20 configuring the storage system 10 is equipped with a recording reproduction processing part 1, a schedule controlling part 2, a node status detecting part 3, a data regeneration controlling part 4, and a data restoration controlling part 5, which are configured by installation of programs into a plurality of arithmetic devices such as a CPU (Central Processing Unit) integrated therein. Moreover, the accelerator node 20 is equipped with a schedule storing part 6 in a storage device integrated therein. All or part of the above-mentioned functions may be integrated in the storage node 30 configuring the storage system 10. Below, the respective configurations will be described in detail.

The recording reproduction controlling part 1 executes a process of distributing and storing data into the storage nodes 30 and a process of retrieving the data stored in the storage nodes 30, in response to a request from a device connected to the storage system 10. Here an example of the distribution storage process will be described with reference to FIGS. 7 and 8. The distribution storage process described below may be executed by the storage node 30 in accordance with an instruction from the recording reproduction controlling part 1, or may be executed by the accelerator node 20.

At first, upon acceptance of an input of data A (an arrow Y1 in FIG. 8), the storage system 10 divides the data A into block data D of a predetermined capacity (e.g., 64 KB) as shown by an arrow Y2 in FIG. 8. Then, based on a data content of this block data D, the storage system 10 calculates a unique hash value H representing the data content (an arrow Y3 in FIG. 8). For example, the hash value H is calculated based on the data content of the block data D by using a preset hash function. This hash value H, which is used for elimination of duplicated recording of data having the same content and for generation of a content address representing a storage place of data, will not be described in detail herein.

Subsequently, the storage system 10 divides the block data D into a plurality of fragment data of a predetermined capacity. For example, the block data D is divided into nine pieces of fragment data (division data 41) as shown by reference numerals D1 to D9 in FIG. 7. Moreover, the storage system 10 generates redundant data so as to be capable of restoring the original block data even when some of the division fragment data are lost, and adds the redundant data to the division fragment data 41. For example, the storage system 10 adds three pieces of fragment data (redundant data 42) as shown by reference numerals D10 to D12 in FIG. 7. Consequently, a data set 40 that includes twelve pieces of fragment data configured by the nine pieces of division data 41 and the three pieces of redundant data 42 is generated (an arrow Y4 in FIG. 8).

Then, the fragment data generated as described above are distributed and stored into respective components 31 formed on the storage nodes 30, respectively, which will be described later. For example, in a case that the twelve pieces of fragment data D1 to D12 are generated as shown in FIG. 7, the fragment data D1 to D12 are stored one by one into the respective components 31, which are data storage regions formed on the respective storage nodes 30 (refer to an arrow Y5 in FIG. 8). The distribution storage process described above may be executed by a function integrated in the storage nodes 30.

In a case that the fragment data are stored as described above, a content address CA representing a storage position of the fragment data D1 to D12, that is, a storage position of the block data D to be restored based on the fragment data D1 to D12 in the storage nodes 30 is generated. At this moment, the content address CA is generated by combining part (a short hash: e.g., initial 8 B (bytes) of the hash value H) of the hash value H calculated based on the content of the stored block data D with information representing a logical storage position. In the accelerator node 20 that manages a file system in the storage system 10, this content address CA and identification information such as a file name of backup target data are associated with each other and managed by the file system.

Then, upon acceptance of a request for retrieval of a file, the storage system 10 can specify a storage position designated by a content address CA corresponding to the requested file and retrieve the respective fragment data stored in this specified storage position as the data requested to be retrieved. Thus, the storage system 10 has a function of reading and writing data (a data processing means, a distribution storage processing means).

Further, the schedule storing part 6 formed in the accelerator node 20 stores operation schedule data that represents, for example, a maintenance schedule set by a manager who manages the storage system 20. For example, the operation schedule data is data representing a schedule to temporarily stop a specific storage node 30 (bring the storage node 30 down) for maintenance, and specifically, includes information specifying a storage node to be brought down, and a time and date to stop. The operation schedule data is not limited to being what is described above.

In order to perform maintenance of the specific storage node 30 in accordance with the operation schedule data, the schedule controlling part 2 provided in the accelerator node 20 executes control to stop the storage node 30 on the set time and date. Moreover, the schedule controlling part 2 also has a function of notifying the data regeneration controlling part 4 of the operation schedule data, namely, a storage node scheduled to stop and a time and date to stop.

Further, the schedule controlling part 2 has a function of controlling an operation status of the storage node 30 in response to an operation instruction inputted into the storage system 10 from the manager or the like. For example, when the manager designates a maintenance time and date through an operation screen of the storage system 10 and gives an instruction to stop a specific storage node 30 on the time and date, or when the manager gives an instruction to restart a specific storage node 30, the schedule controlling part 2 stops the storage node 30 (brings the storage node 30 down) in response to the operation instruction. Then, the schedule controlling part 2 notifies the data regeneration controlling part 4 of the stoppage.

Further, the node status detecting part 3 (an operation status detecting means) provided in the accelerator node 20 detects an operation status of each of the storage nodes 30, that is, detects whether each of the storage nodes 30 is operating and operable, or is stopped (down) and inoperable. Then, the node status detecting part 3 has a function of notifying the data regeneration controlling part 4 and the data restoration controlling part 5 of the detected operation status of each of the storage nodes 30.

Furthermore, the node status detecting part 3 counts the frequency of stoppages of each of the storage nodes 30, for example, counts the number of stoppages (going down) within a preset time (e.g., one hour) for each of the storage nodes 30. Then, the node status detecting part 3 notifies the data regeneration controlling part 4 and the data restoration controlling part 5 of the counted number of going down.

Figure 1:
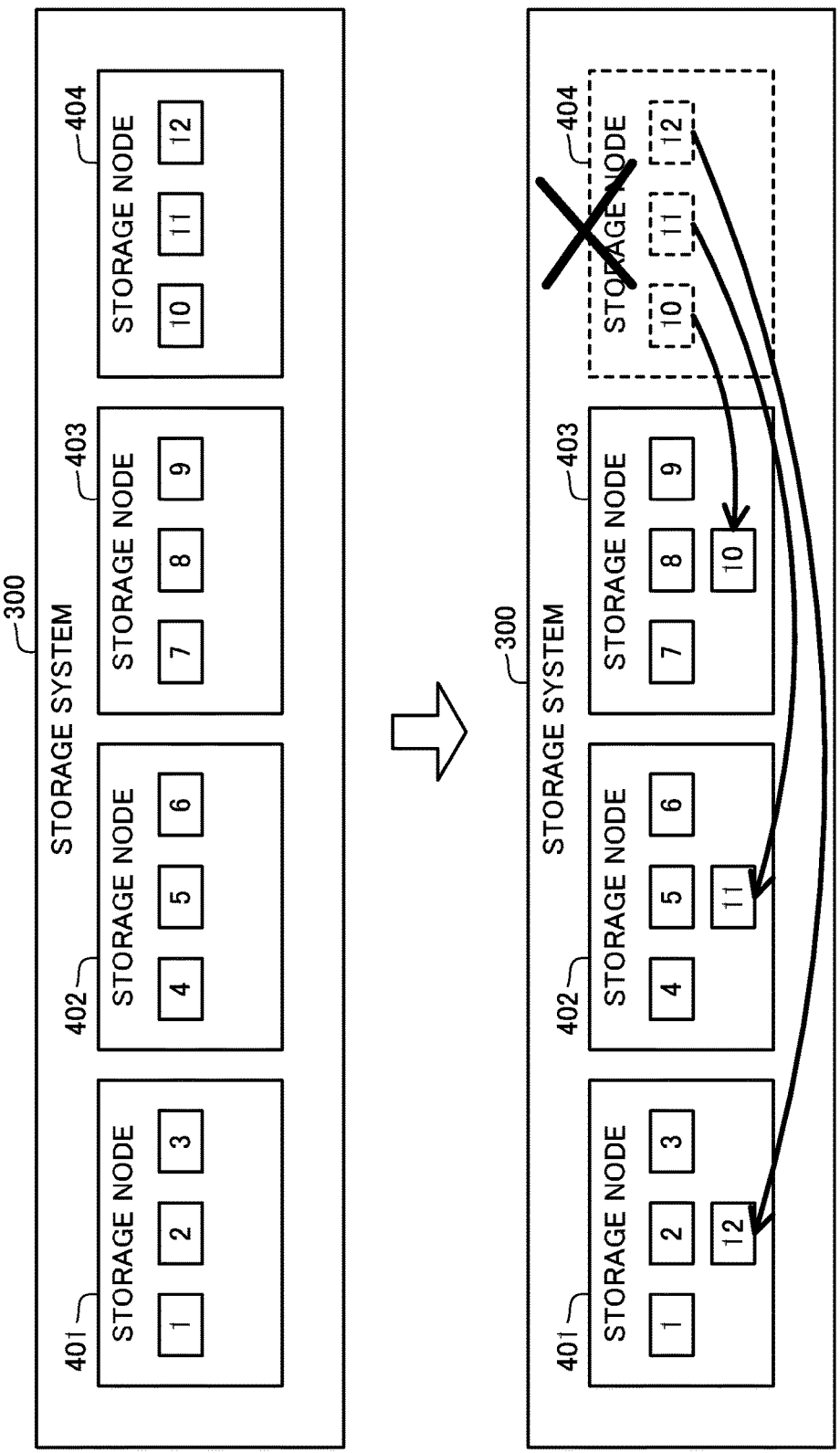
FIG. 1 is a diagram showing an operation of a storage system relating to the present invention.
Figure 2:
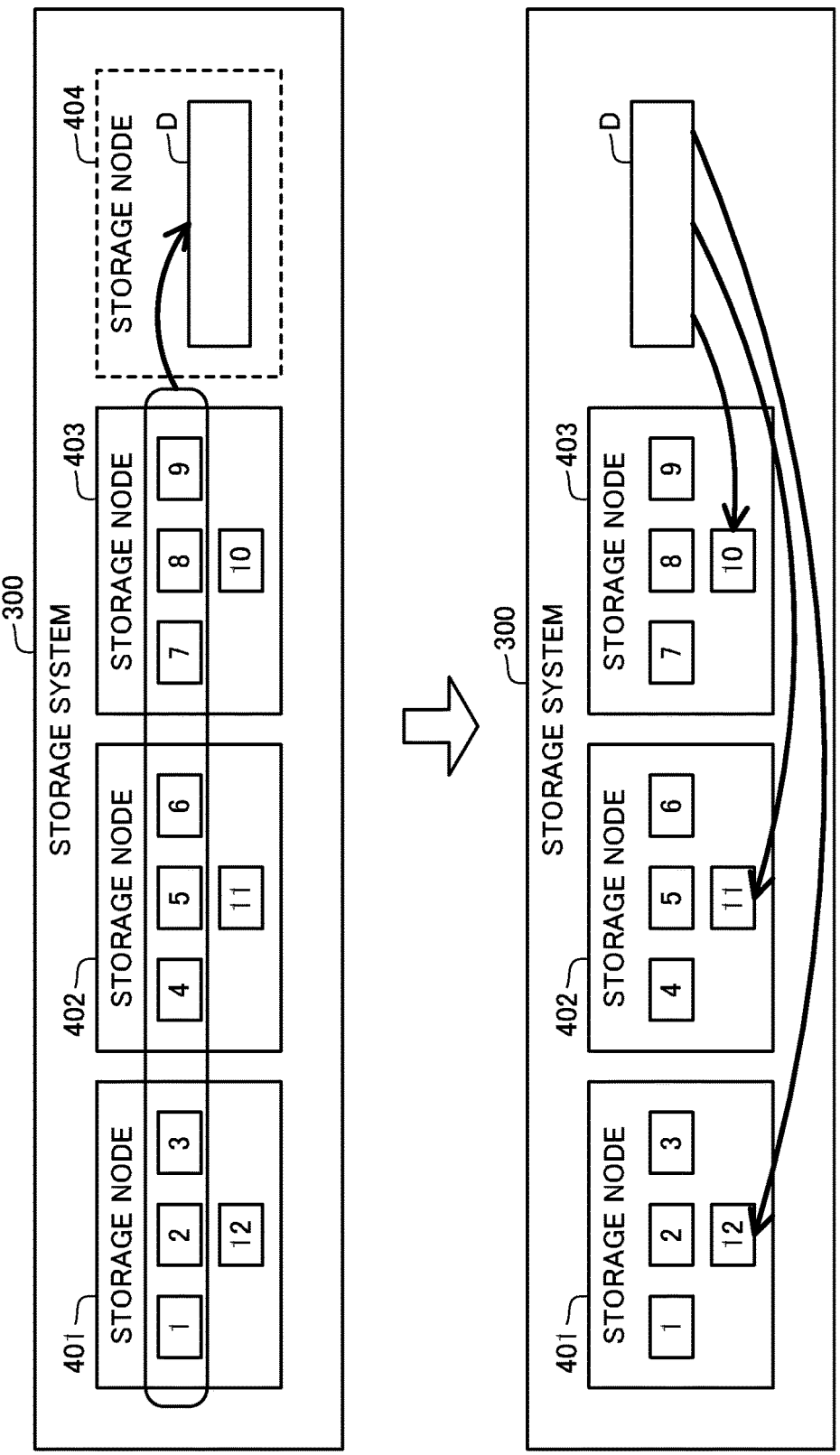
FIG. 2 is a diagram showing an operation of the storage system relating to the present invention.

Further, upon acceptance of a notification of going down of one storage node 30 based on a detection result from the node status detecting part 3, the data regeneration controlling part 4 (a data regenerating means) provided in the accelerator node 20 regenerates fragment data having been stored in the one storage node 30 based on fragment data stored in the other operating storage nodes 30, and distributes and stores the fragment data into the other storage nodes 30. Because this data regeneration process is the same as the process described above with reference to FIGS. 1 and 2, a detailed description thereof will be omitted.

In addition to the abovementioned function, the data regeneration controlling part 4 controls an operation of each of the storage nodes 30 so that data stored in one storage node 30 scheduled to be stopped based on the operation schedule data are distributed and stored into the other storage nodes 30. To be specific, in a case that one storage node is scheduled to stop at a predetermined time and date by the operation schedule, the data regeneration controlling part 4 executes control to distribute and transfer data stored in the storage node 30 scheduled to stop to the other storage nodes 30 and complete this data transfer before the time and date to stop. Consequently, in a case that the storage node 30 scheduled to stop is stopped on schedule, the data in the storage node 30 are distributed and stored into the other storage nodes. Therefore, at the time of retrieval of the data in the stopped storage node 30, it is only required to retrieve the data from the other storage nodes 30 to which the data have been transferred. Since the data transfer process described above is just transfer of data stored in one storage node 30 scheduled to stop to the other storage nodes 30, processing load on the storage system 10 is low.

Further, because data stored in the storage node 30 scheduled to stop can be retrieved from the other storage nodes 30 even immediately after the storage node 30 stops as described above, there is no need to regenerate the data stored in the storage node 30 having stopped. That is to say, when the down storage node 30 goes down on schedule in accordance with the operation schedule data, the data regeneration controlling part 4 does not execute a process of regenerating the data having been stored in the down storage node 30.

Thus, regarding the storage node 30 stopped in accordance with the operation schedule, the data stored therein is transferred to the other storage nodes 30 before the stoppage, and the data regeneration process is not executed at the time of the stoppage. This is because the storage node 30 is stopped in a manager's deliberate setting for maintenance or the like and hence it is sure that the storage node 30 recovers later. Consequently, since execution of the data regeneration process is limited, it is possible to reduce processing load on the storage system 10, and it is possible to achieve increase of performance.

Further, upon acceptance of a notification of stoppage (going down) of one storage node 30 based on a detection result from the node status detecting part 3, the data regeneration controlling part 4 checks whether the storage node 30 is down because of an operation instruction inputted by the manager or the like, and moreover, checks whether the number of going down within a predetermined time is equal to or more than a predetermined maximum number set in advance.

Then, in a case that the storage node 30 has not been down because of an operation instruction and the number of going down is equal to or more than the predetermined maximum number, the data regeneration controlling part 4 executes a data regeneration process of regenerating data having been stored in the down storage node 30 based on fragment data stored in the other operating storage nodes 30 to distribute and store into the other operating storage node 30. At this moment, the data regeneration process is executed with higher priority than the priority set on other processes so as to be executed prior to the other processes in the storage system 10. For example, the data regeneration process executed at this moment is executed with the highest priority in the storage system 10.

Further, in a case that the storage node 30 is down because of an operation instruction, or in a case that the number of going down of the storage node 30 is less than the predetermined maximum number, the data regeneration controlling part 4 executes a data regeneration process of regenerating data having been stored in the down storage node 30 based on fragment data stored in the other operating storage nodes 30 to distribute and store into the other operating storage node 30. However, the data regeneration process in this case is executed with lower priority than the priority set on other processes in the storage system 10. For example, this data regeneration process is executed with lower priority than the priority set on the abovementioned data regeneration process executed when a storage node 30 whose number of going down is equal to or more than the predetermined maximum number goes down.

Furthermore, as described above, the data regeneration controlling part 4 executes a process of regenerating data having been stored in the down storage node 30 with low priority and, in a case that the down storage node 30 does not recover even when a time of execution of the process exceeds a preset time, executes the process of regenerating the data having been stored in the storage node 30 with high priority. For example, the data regeneration controlling part 4 changes the priority on the data regeneration process to the highest priority in the storage system 10.

Figure 3:
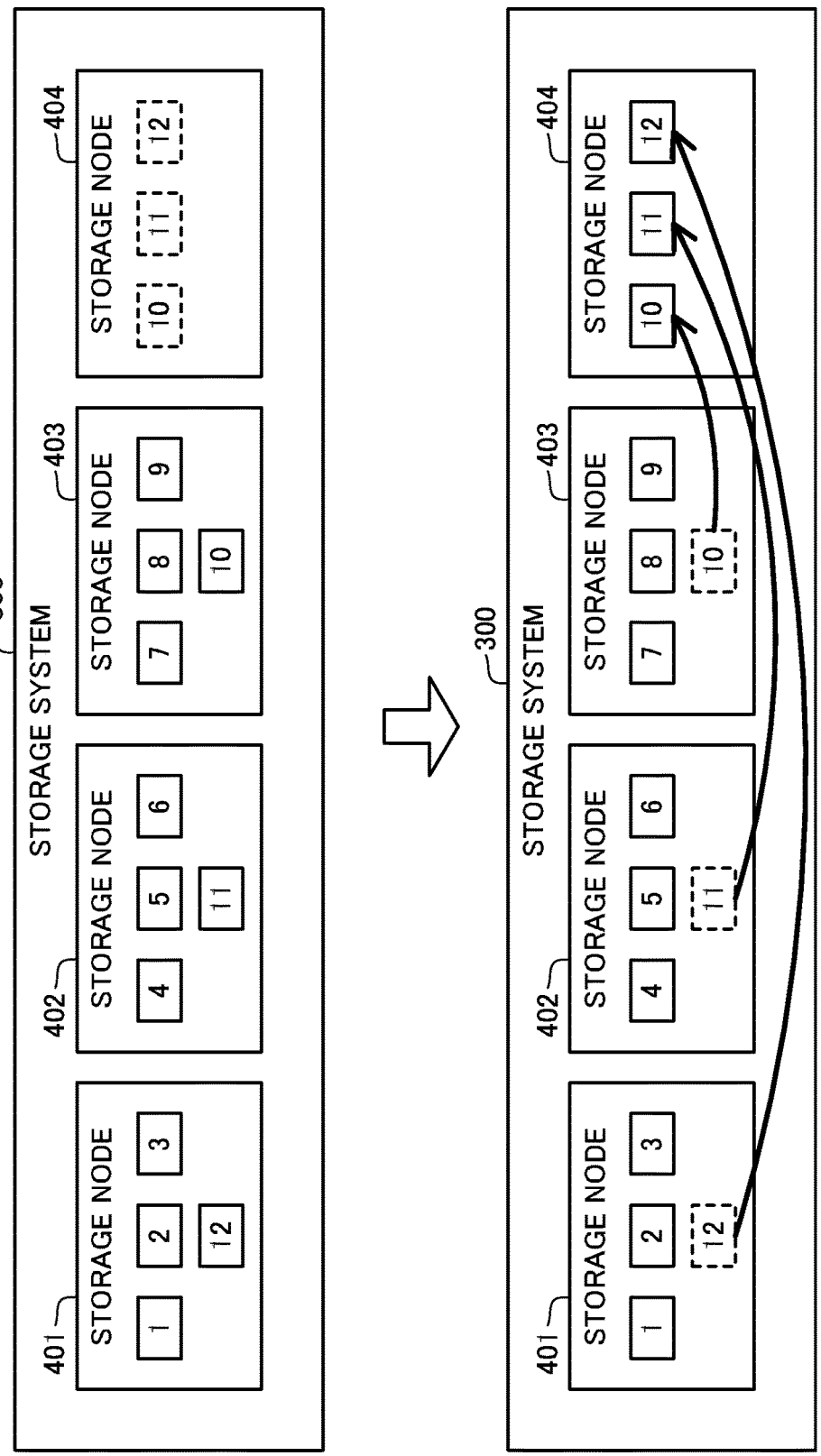
FIG. 3 is a diagram showing an operation of the storage system relating to the present invention.

Further, when accepting a notification of recovery of the down storage node 30 in accordance with a detection result from the node status detecting part 3, the data restoration controlling part 5 (a data restoring means) controls each of the storage nodes 30 so that the fragment data are restored to the down storage node 30 from the other storage nodes 30. Because a process of restoring data is the same as the process described above with reference to FIG. 3, a detailed description thereof will be omitted.

However, in a case that the number of going down in the past of the recovered storage node 30 is more than the predetermined maximum number, the data restoration controlling part 5 does not execute restoration of the fragment data to the storage node 30. That is to say, the data having been stored in the recovered storage node 30 remains stored in the other storage nodes 30 at the time of regeneration of the data. Then, the recovered storage node 30 is separated from the storage system 10 and is, for example, replaced.

[Operation]

Figure 12:
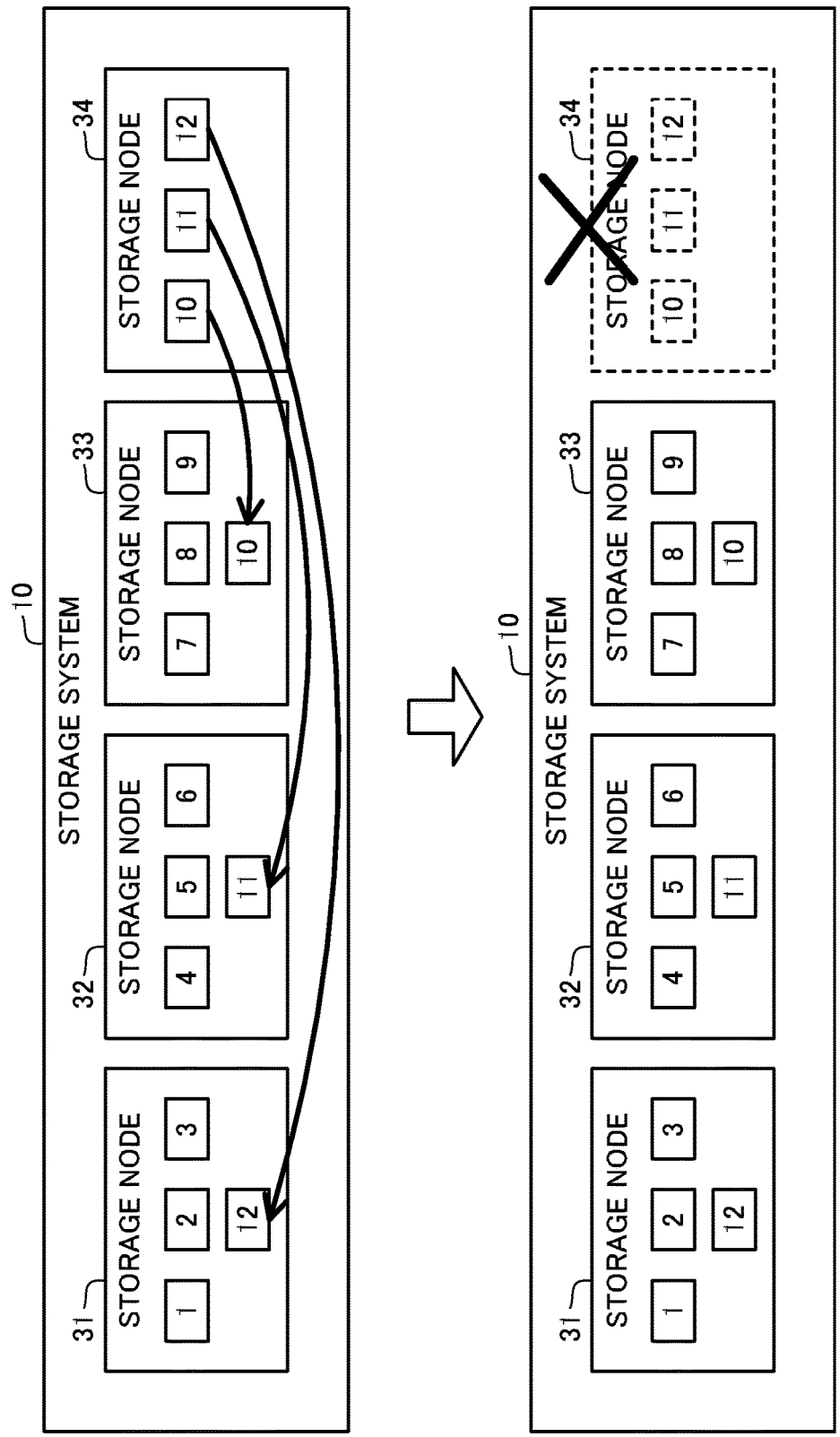
FIG. 12 is an explanation view for explaining an operation of the storage system disclosed in FIG. 6.
Figure 13:
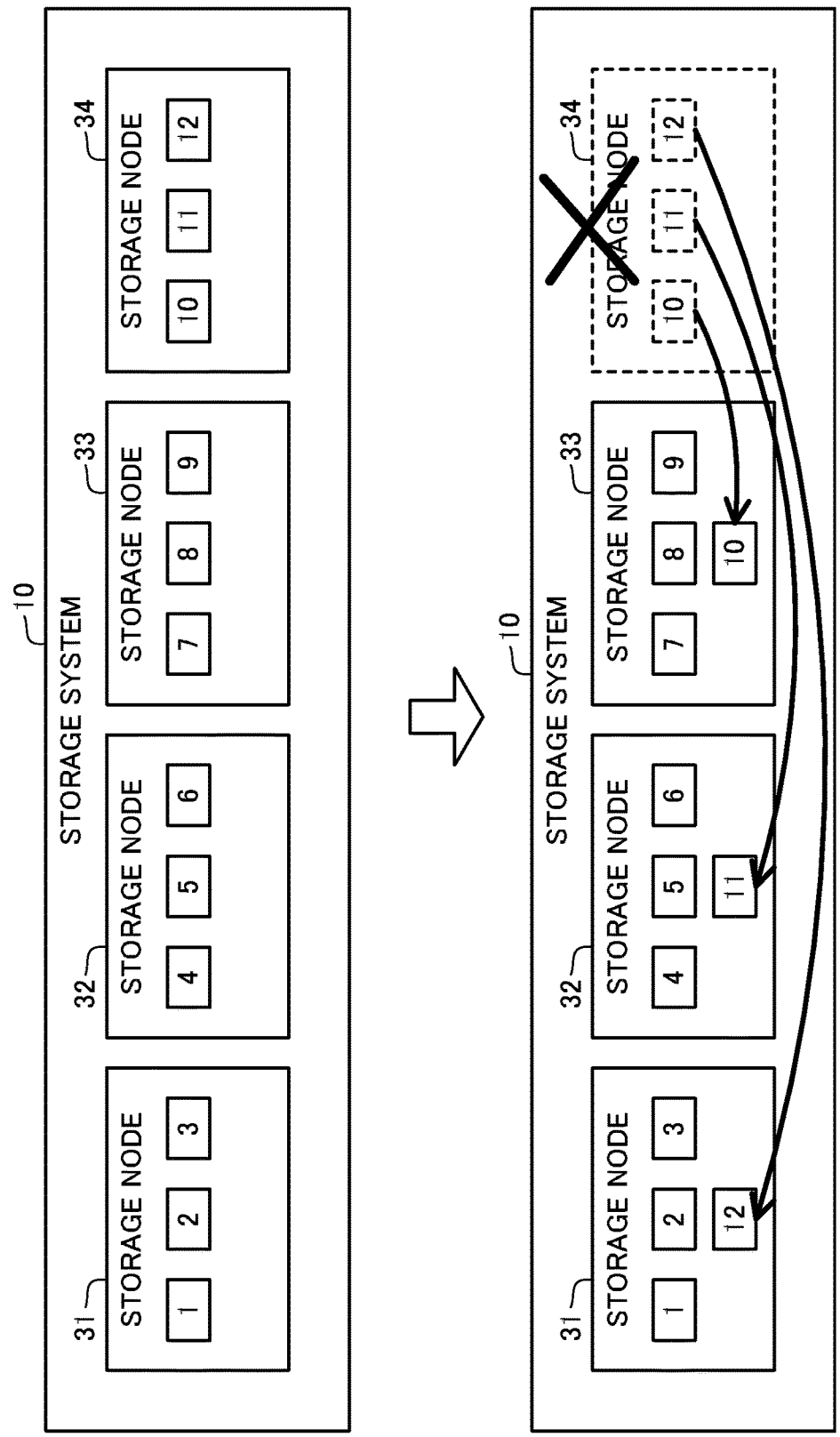
FIG. 13 is an explanation view for explaining an operation of the storage system disclosed in FIG. 6.
Figure 14:
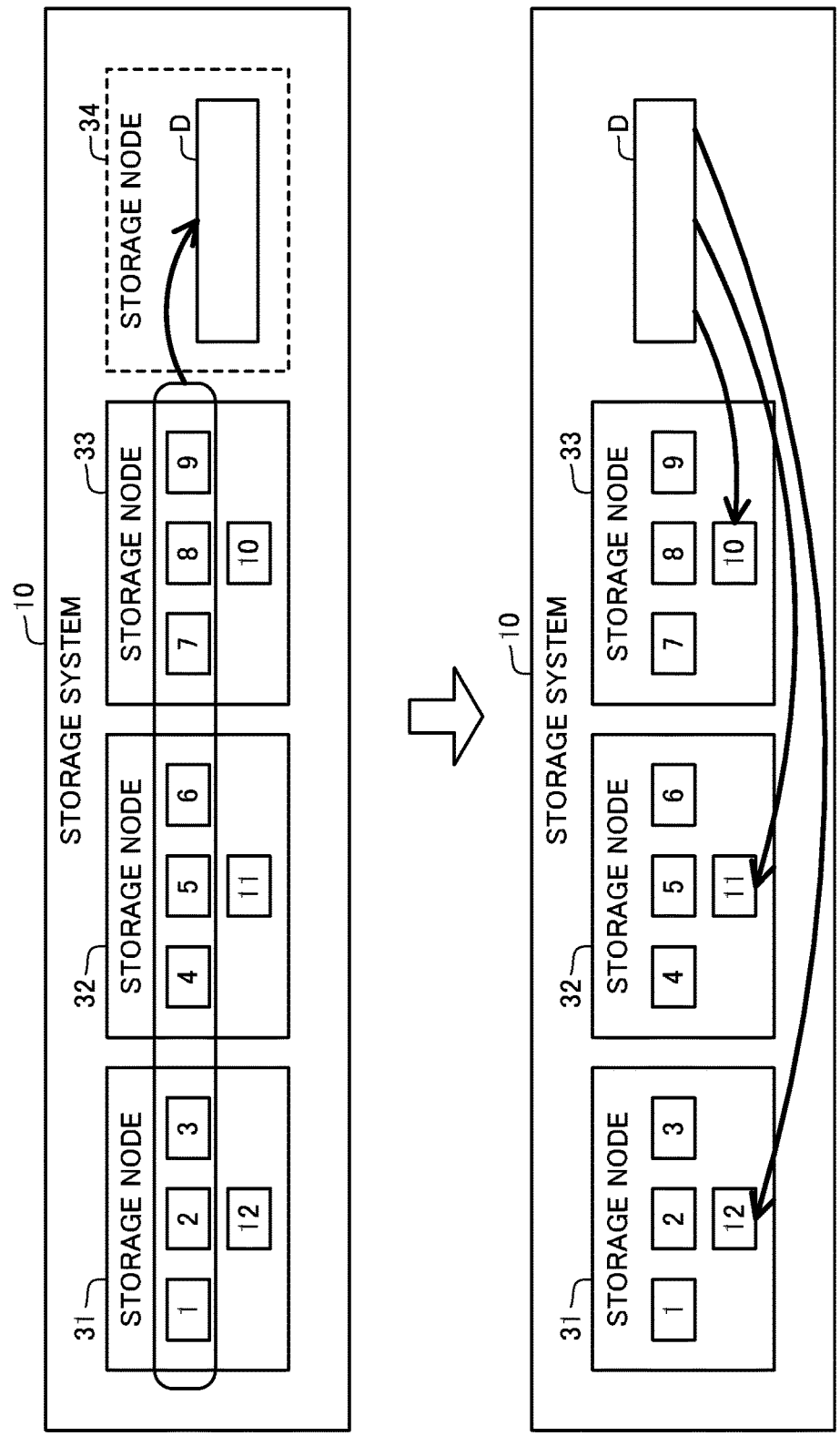
FIG. 14 is an explanation view for explaining an operation of the storage system disclosed in FIG. 6.
Figure 15:
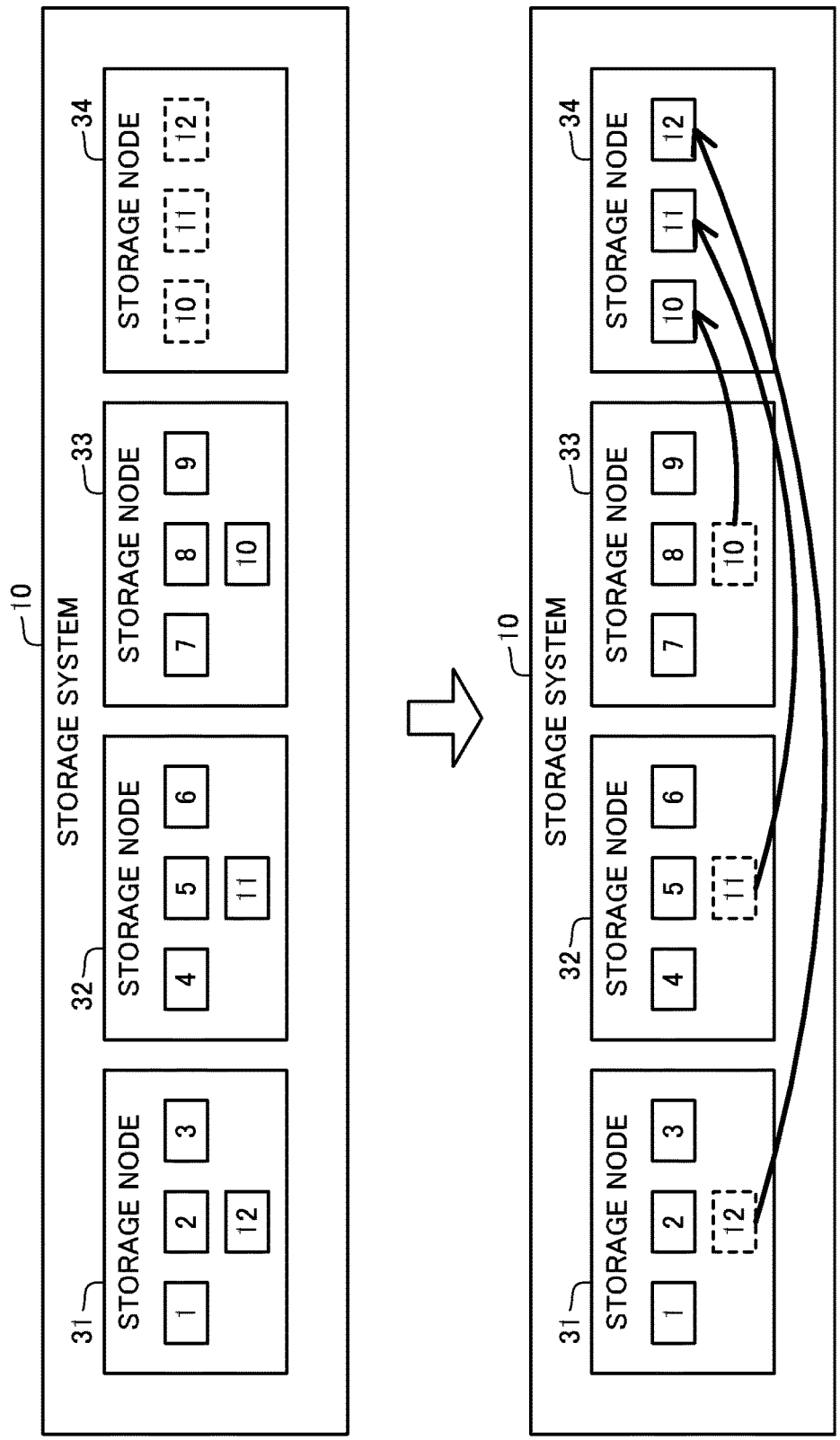
FIG. 15 is an explanation view for explaining an operation of the storage system disclosed in FIG. 6.

Next, an operation of the storage system 10 described above will be explained with reference to flowcharts of FIGS. 9 to 11 and explanation views of FIGS. 12 to 16. Here, it is assumed that, as shown in FIG. 12, the storage system 10 is equipped with four storage nodes denoted by reference numerals 31 to 34.

First, with reference to FIG. 9, an operation in a case that an operation schedule exists will be explained. The storage system 10 checks a preset operation schedule, and checks whether there is a schedule to stop a storage node (bring the storage node down) for maintenance later (step S1). Then, in a case that the storage node denoted by reference numeral 34 in FIG. 12 is scheduled to be brought down later (step S1: Yes), the storage system 10 transfers data 10, 11 and 12 stored in the storage node 34 to the other storage nodes 31, 32 and 33 before the maintenance starts, that is, before the storage node 34 is brought down (step S2). At this moment, for example, as shown by arrows on the upper side of FIG. 12, the storage system 10 distributes and transfers the data of respective components 10, 11 and 12 to the storage nodes 31, 32 and 33, respectively.

Then, when transfer of the data is completed before a scheduled date and time to stop (step S3: No, step S4), the storage node 34 is brought down on schedule as shown on the lower side of FIG. 12.

Next, with reference to FIG. 10, an operation when the storage system 10 detects that a storage node is down will be described. At first, it is assumed that the storage system 10 detects the down status of the storage node 34 from a normal status as shown on the upper side of FIG. 13 (step S11). Then, the storage system 10 checks whether the storage node 34 has gone down by an operation inputted by the manager or the like (step S12). In this case, even when the storage node 34 is down in accordance with the aforementioned operation schedule, the storage system 10 determines that the storage node 34 is down in accordance with the operation.

Then, when the storage node 34 has gone down in accordance with the preset operation schedule explained above with reference to FIG. 9 (step S13: Yes), the storage system 10 ends the operation. That is to say, because the data 12, 11 and 10 in the storage node 34 have already been transferred to the other storage nodes 31, 32 and 33 as shown on the lower side of FIG. 12, a data regeneration process is not executed. Data newly written in while the storage node 34 is down is written into the components 12, 11 and 10 formed on the other storage nodes 31, 32 and 33.

Further, in a case that the storage node 34 has gone down because of an operation by the operator or the like (step S12: No) but not because of the operation schedule (step S13: No), the storage system 10 executes a process of regenerating the data having been stored in the storage node 34. To be specific, firstly, as shown from the upper side to the lower side of FIG. 13, the storage system 10 regenerates the components 10, 11 and 12 storing data formed on the down storage node 34 in the other operating storage nodes 33, 32 and 31 (step S14). Then, as shown on the upper side of FIG. 14, the storage system 10 loads the fragments 1 to 9 stored in the other operating storage nodes 31, 32 and 33, regenerates data D having been stored in the down storage node 34 based on the data, and divides the data D again, thereby regenerating lost fragments. After that, as shown on the lower side of FIG. 14, the storage system 10 distributes and stores the regenerated fragments into the newly generated components 10, 11 and 12, that is, distributes and stores into the other operating storage nodes 33, 32 and 31 (step S15).

However, the abovementioned data regeneration process is executed with low priority in the storage system 10. For example, this data regeneration process is executed with lower priority than the priority on a data regeneration process executed at step S19 described later.

After that, the data regeneration process continues with the abovementioned low priority for a preset time and, in a case that the down storage node 34 does not recover during the time (step S16: Yes), the data regeneration process is executed with higher priority than before (step S19).

Further, after detection of the down status of the storage node 34 (step S11), in a case that the storage node 34 has not been down because of an operation by the manager or the like (step S12: No), the storage system 10 checks whether a number n of going down within a given time T of the down storage node 34 is smaller than the predetermined maximum number (step S17). At this moment, in a case that the number n of going down within the given time T of the storage node 34 is smaller than the predetermined maximum number (step S17: No), the storage system 10 proceeds to steps S14 and S15, and executes a process of regenerating the data having been stored in the down storage node 34 with low priority (steps S14 and S15). Then, in a case that the data regeneration process continues with low priority for a preset time and the down storage node 34 does not recover during the time (step S16: Yes), the data regeneration process is executed with higher priority than before (step S19).

Further, it is assumed that, after the storage system 10 detects the down status of the storage node 34 (step S11), the down status is caused by an operation by the manager or the like (step S12: No), and the number n of going down within the given time T of the down storage node 34 is equal to or more than the predetermined maximum number of times (step S17: Yes). In this case, in the same manner as described above, as shown on the lower side of FIG. 13, the storage system 10 regenerates the components 10, 11 and 12 storing data having been formed on the down storage node 34 in the other operating storage nodes 33, 32 and 31 (step S18). Then, as shown on the upper side of FIG. 14, the storage system 10 loads the fragments 1 to 9 stored in the other operating storage nodes 31, 32 and 33, regenerating data D having been stored in the down storage node 34 based on the data, dividing the data D again, thereby regenerating the lost fragments. After that, as shown on the lower side of FIG. 14, the storage system 10 distributes and stores the regenerated fragments into the newly generated components 10, 11 and 12, that is, into the other operating storage nodes 33, 32 and 31 (step S19). At this moment, to be specific, the data regeneration process is executed with high priority in the storage system 10. For example, the data regeneration process is executed with higher priority than the priority on the data regeneration process executed at step S15 described above.

Next, with reference to FIG. 11, an operation when recovery of a down storage node is detected will be described. At first, it is assumed that the storage system 10 detects the down storage node 34 has recovered as shown on the upper side of FIG. 15 from a down status of the storage node 34 (step S21). Then, the storage system 10 checks whether the down status of the recovered storage node 34 has been caused by an operation inputted from the manager or the like (step S22).

Then, in a case that the down status of the recovered storage node 34 has been caused by the operation inputted from the manager or the like (step S22: Yes), the data are restored to the recovered storage node 34 from the other storage nodes 31, 32 and 33 as shown on the lower side of FIG. 15. Because a data restoration process executed at this moment is as described above with reference to FIG. 3, a detailed description thereof will be omitted.

Further, it is assumed that the down status of the recovered storage node 34 has not been caused by the operation inputted from the manager or the like (step S22: No) and the number n of going down within the given time T of the recovered storage node 34 is less than the predetermined maximum number (step S24: No). In this case, in the same manner as described above, the data are restored to the recovered storage node 34 from the other storage nodes 31, 32 and 33 as shown on the lower side of FIG. 15.

Figure 16:
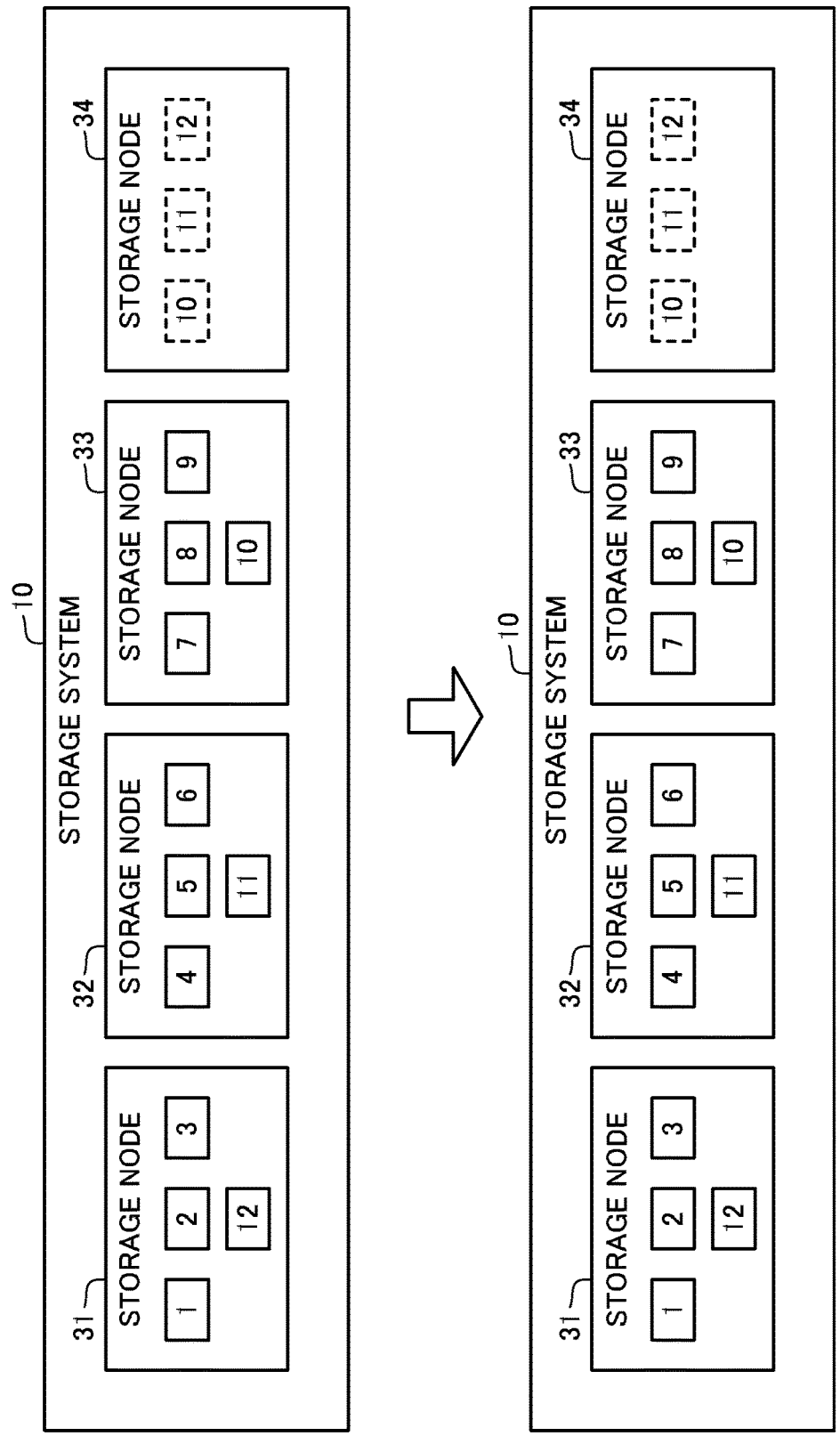
FIG. 16 is an explanation view for explaining an operation of the storage system disclosed in FIG. 6.

Further, it is assumed that the down status of the recovered storage node 34 has not been caused by the operation inputted from the manager or the like (step S22: No) and the number n of going down in the given time T of the recovered storage node 34 is equal to or more than the predetermined maximum number (step S24: Yes). In this case, as shown in FIG. 16, the data remains without being restored to the recovered storage node 34. That is to say, the recovered storage node 34 is not used, and is kept separated from the storage system 10 until an instruction is inputted from the manager or the like.

Thus, according to the storage system 10 in this exemplary embodiment, in a case that one storage node is previously scheduled to be brought down, fragment data stored in the storage node is transferred and stored into the other storage nodes before the one storage node is brought down. Consequently, even when the storage node goes down, data stored in the storage node has already been stored into the other storage nodes, and hence, there is no need to execute a regeneration process. Therefore, it is possible to reduce processing load on the storage system while maintaining the reliability of data.

Further, in a case that a storage node has been brought down by an operation by the user, or in a case that the number of going down of a down storage node is small, regeneration of fragment data having been stored in the down storage node is executed. At this moment, the regeneration process is executed with low priority. Therefore, in a case that the down storage node immediately recovers, the regeneration process has been executed with low priority, with the result that it is possible to reduce processing load on the storage system. On the other hand, in a case that the number of going down is large, or in a case that the down storage node does not recover for long hours, it is possible by executing the regeneration process with high priority to speedily restore data and achieve increase of the reliability of the data.

Furthermore, when a storage node recovers but the storage node has gone down a number of times before recovery, the storage node will not be used. Consequently, it is possible to separate a storage node with low reliability, and thereby achieve increase of the reliability of the whole storage system.

<Supplementary Notes>

The whole or part of the exemplary embodiments disclosed above can also be described as the following supplementary notes. Below, a configuration of a storage system according to the present invention will be described with reference to FIG. 17. Moreover, configurations of an information processing device, a program and an information processing method according to the present invention will be described. However, the present invention will not be limited to the following configurations.

(Supplementary Note 1)

A storage system, comprising a plurality of storing means 200 and a data processing means 100 for storing data into the plurality of storing means 200 and retrieving the data stored in the storing means 200, wherein the data processing means 100 includes:

a distribution storage processing means 101 for distributing and storing a plurality of fragment data including division data obtained by dividing storage target data into a plurality of pieces and redundant data for restoring the storage target data, into the plurality of storing means 200;

an operation status detecting means 102 for executing detection of an operation status of each of the storing means 200; and a data regenerating means 103 for, in accordance with a result of the detection by the operation status detecting means 102, when any of the storing means 200 goes down, executing regeneration of the fragment data having been stored in the down storing means 200 based on other of the fragment data stored in another of the storing means 200 different from the down storing means 200, and storing into the other of the storing means 200; and wherein the data regenerating means 103 has a function of transferring and storing the fragment data stored in the storing means 200 previously scheduled to go down into another of the storing means 200 before the storing means 200 scheduled to go down goes down.

(Supplementary Note 2)

The storage system according to Supplementary Note 1, wherein based on operation schedule data in which it is previously set the storing means goes down, the data regenerating means transfers and stores the fragment data stored in the storing means into another of the storing means before the storing means goes down and, when the storing means scheduled to go down goes down, the data regenerating means does not execute the regeneration of the fragment data having been stored in the storing means.

According to the invention, firstly, a storage system divides storage target data into a plurality of division data, generates redundant data for restoring the storage target data, and distributing and storing a plurality of fragment data including the division data and the redundant data into a plurality of storing means. Moreover, when the storing means causes a failure and goes down, the storage system regenerates the fragment data stored in the down storing means based on the other fragment data, and stores into the other storing means.

Then, in this storage system, in a case that the storing means is previously scheduled to go down, before the storing means goes down on schedule, the fragment data stored in the storing means is transferred and stored into the other storing means. Consequently, even when this storing means goes down, there is no need to execute a regeneration process because the data having been stored in the storing means has already been stored into the other storing means. Therefore, it is possible to reduce processing load on the storage system while maintaining the reliability of data.

(Supplementary Note 3)

The storage system according to Supplementary Note 1 or 2, wherein when any of the storing means goes down in accordance with an inputted operation instruction, the data regenerating means executes a process of the regeneration of the fragment data having been stored in the down storing means with lower priority than priority set on another process in the storage system.

(Supplementary Note 4)

The storage system according to any of Supplementary Notes 1 to 3, wherein when any of the storing means goes down, in a case that a number of going down within a previously set time of the down storing means is less than a previously set number, the data regenerating means executes a process of the regeneration of the fragment data having been stored in the down storing means with lower priority than priority set on another process in the storage system.

(Supplementary Note 5)

The storage system according to Supplementary Note 3 or 4, wherein when any of the storing means goes down, in a case that a number of going down within a previously set time of the down storing means is equal to or more than a previously set number, the data regenerating means executes the process of the regeneration of the fragment data having been stored in the down storing means with higher priority than priority set on another process in the storage system.

(Supplementary Note 6)

The storage system according to any of Supplementary Notes 3 to 5, wherein in a case that a time of execution of the process of the regeneration of the fragment data stored in the down storing means with the lower priority exceeds a previously set time, the data regenerating means executes the process of the regeneration with higher priority than the lower priority.

According to the invention, in a case that the storing means goes down in the storage system because of an operation by a user or because the number of going down of the down storing means is small, regeneration of the fragment data stored in the down storing means is executed, but the priority on the regeneration process is set low at this moment. Therefore, in a case that the down storing means immediately recovers, the regeneration process has been executed with low priority, with result that it is possible to reduce processing load on the storage system. On the other hand, in a case that the number of going down is large, or in a case that the down storing means does not recover for long hours, it is possible by executing the regeneration process with high priority to speedily restore the data and achieve increase of the reliability of the data.

(Supplementary Note 7)

The storage system according to any of Supplementary Notes 1 to 6, comprising a data restoring means for, when the down storing means recovers, executing restoration of the fragment data stored in the other of the storing means by a process of the regeneration into the recovered storing means, wherein in a case that a number of going down within a previously set time of the recovered storing means is equal to or more than a previously set number, the data restoring means does not execute restoration of the fragment data into the storing means.

According to the invention, in a case that the storing means recovers but the storing means has gone down a number of times before recovering, recovery will not be executed and the storing means will not be used. Thus, it is possible to separate a storing means of low reliability from the storage system and thereby achieve increase of the reliability of the whole storage system.

(Supplementary Note 8)

An information processing device that is connected to a plurality of storing means and that stores data into the plurality of storing means and retrieves the data stored in the storing means, the information processing device comprising:

a distribution storage processing means for distributing and storing a plurality of fragment data including division data obtained by dividing storage target data into a plurality of pieces and redundant data for restoring the storage target data, into the plurality of storing means;

an operation status detecting means for executing detection of an operation status of each of the storing means; and a data regenerating means for, in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means, wherein the data regenerating means has a function of transferring and storing the fragment data stored in the storing means previously scheduled to go down into another of the storing means before the storing means scheduled to go down goes down.

(Supplementary Note 9)

The information processing device according to Supplementary Note 8, wherein based on operation schedule data in which it is previously set the storing means goes down, the data regenerating means transfers and stores the fragment data stored in the storing means into another of the storing means before the storing means goes down and, when the storing means scheduled to go down goes down, the data regenerating means does not execute the regeneration of the fragment data having been stored in the storing means.

(Supplementary Note 10)

A computer program comprising instructions for causing an information processing device that is connected to a plurality of storing means and that stores data into the plurality of storing means and retrieves the data stored in the storing means, to realize:

a distribution storage processing means for distributing and storing a plurality of fragment data including division data obtained by dividing storage target data into a plurality of pieces and redundant data for restoring the storage target data, into the plurality of storing means;

an operation status detecting means for executing detection of an operation status of each of the storing means; and a data regenerating means for, in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means, and transferring and storing the fragment data stored in the storing means previously scheduled to go down into another of the storing means before the storing means goes down.

(Supplementary Note 11)

The computer program according to Supplementary Note 10, wherein based on operation schedule data in which it is previously set the storing means goes down, the data regenerating means transfers and stores the fragment data stored in the storing means into another of the storing means before the storing means goes down and, when the storing means scheduled to go down goes down, the data regenerating means does not execute the regeneration of the fragment data having been stored in the storing means.

(Supplementary Note 12)

An information processing method in an information processing device that is connected to a plurality of storing means and that stores data into the plurality of storing means and retrieves the data stored in the storing means, the information processing method comprising:

distributing and storing a plurality of fragment data including division data obtained by dividing storage target data into a plurality of pieces and redundant data for restoring the storage target data, into the plurality of storing means;

executing detection of an operation status of each of the storing means; and in accordance with a result of the detection by the operation status detecting means, when any of the storing means goes down, executing regeneration of the fragment data having been stored in the down storing means based on other of the fragment data stored in another of the storing means different from the down storing means, and storing into the other of the storing means; and the information processing method comprising transferring and storing the fragment data stored in the storing means previously scheduled to go down into another of the storing means before the storing means goes down.

(Supplementary Note 13)

The information processing method according to Supplementary Note 12, wherein based on operation schedule data in which it is previously set the storing means goes down, the fragment data stored in the storing means is transferred and stored into another of the storing means before the storing means goes down and, when the storing means scheduled to go down goes down, the regeneration of the fragment data having been stored in the storing means is not executed.

The present invention is based upon and claims the benefit of priority from Japanese patent application No. 2010-013890, filed on Jan. 26, 2010, the disclosure of which is incorporated herein in its entirety by reference.

DESCRIPTION OF NUMERALS

1 recording reproduction processing part
2 schedule controlling part
3 node status detecting part
4 data regeneration controlling part
5 data restoration controlling part
6 schedule storing part
10 storage system
11 backup system
12 backup target device
20 accelerator node
30, 31, 32, 33, 34 storage node
100 data processing device
101 distribution storage processing means
102 operation status detecting means
103 data regenerating means
200 storing means
300 storage system
401 to 404 storage node

The invention claimed is:

1. A storage system, comprising a plurality of storing units and a data processing unit for storing data into the plurality of storing units and retrieving the data stored in the storing units, wherein the data processing unit includes:

a distribution storage processing unit for distributing and storing a plurality of fragment data including division data obtained by dividing storage target data into a plurality of pieces and redundant data for restoring the storage target data, into the plurality of storing units;

an operation status detecting unit for executing detection of an operation status of each of the storing units; and a data regenerating unit for, in accordance with a result of the detection by the operation status detecting unit, when any of the storing units goes down, executing regeneration of the fragment data having been stored in the down storing unit based on other of the fragment data stored in another of the storing units different from the down storing unit, and storing into the other of the storing units; and wherein the data regenerating unit has a function of transferring and storing the fragment data stored in the storing unit previously scheduled to go down into another of the storing units before the storing unit scheduled to go down goes down, wherein based on operation schedule data in which it is previously set the storing unit goes down, the data regenerating unit transfers and stores the fragment data stored in the storing unit into another of the storing units before the storing unit goes down and, when the storing unit scheduled to go down goes down, the data regenerating unit does not execute the regeneration of the fragment data having been stored in the storing unit, wherein when any of the storing units goes down in accordance with an input operation instruction, the data regenerating unit executes a process of the regeneration of the fragment data having been stored in the down storing unit with lower priority than priority set on another process in the storage system, and wherein in a case that the down storage unit does not recover within a preset time during the time of execution of the process of the regeneration of the fragment data stored in the down storing unit with the lower priority, the data regenerating unit executes the process of the regeneration with higher priority than the lower priority.

2. The storage system according to claim 1, wherein when any of the storing units goes down, in a case that a number of times of going down within a previously set time of the down storing unit is less than a previously set number, the data regenerating unit executes a process of the regeneration of the fragment data having been stored in the down storing unit with lower priority than priority set on another process in the storage system.

3. The storage system according to claim 1, wherein when any of the storing units goes down, in a case that a number of times of going down within a previously set time of the down storing unit is equal to or more than a previously set number, the data regenerating unit executes the process of the regeneration of the fragment data having been stored in the down storing unit with higher priority than priority set on another process in the storage system.

4. The storage system according to claim 1, comprising a data restoring unit for, when the down storing unit recovers, executing restoration of the fragment data stored in the other of the storing units by a process of the regeneration into the recovered storing unit, wherein in a case that a number of times of going down within a previously set time of the recovered storing unit is equal to or more than a previously set number, the data restoring unit does not execute restoration of the fragment data into the storing unit.

5. An information processing device that is connected to a plurality of storing units and that stores data into the plurality of storing units and retrieves the data stored in the storing units, the information processing device comprising:

a distribution storage processing unit for distributing and storing a plurality of fragment data including division data obtained by dividing storage target data into a plurality of pieces and redundant data for restoring the storage target data, into the plurality of storing units;

an operation status detecting unit for executing detection of an operation status of each of the storing units; and a data regenerating unit for, in accordance with a result of the detection by the operation status detecting unit, when any of the storing units goes down, executing regeneration of the fragment data having been stored in the down storing unit based on other of the fragment data stored in another of the storing units different from the down storing unit, and storing into the other of the storing units, wherein the data regenerating unit has a function of transferring and storing the fragment data stored in the storing unit previously scheduled to go down into another of the storing units before the storing unit scheduled to go down goes down, wherein based on operation schedule data in which it is previously set the storing unit goes down, the data regenerating unit transfers and stores the fragment data stored in the storing unit into another of the storing units before the storing unit goes down and, when the storing unit scheduled to go down goes down, the data regenerating unit does not execute the regeneration of the fragment data having been stored in the storing unit, wherein when any of the storing units goes down in accordance with an input operation instruction, the data regenerating unit executes a process of the regeneration of the fragment data having been stored in the down storing unit with lower priority than priority set on another process in the storage system, and wherein in a case that the down storage unit does not recover within a preset time during the time of execution of the process of the regeneration of the fragment data stored in the down storing unit with the lower priority, the data regenerating unit executes the process of the regeneration with higher priority than the lower priority.

6. A non-transitory computer-readable medium storing a program comprising instructions for causing an information processing device that is connected to a plurality of storing units and that stores data into the plurality of storing units and retrieves the data stored in the storing units, to realize:

a distribution storage processing unit for distributing and storing a plurality of fragment data including division data obtained by dividing storage target data into a plurality of pieces and redundant data for restoring the storage target data, into the plurality of storing units;

an operation status detecting unit for executing detection of an operation status of each of the storing units; and a data regenerating unit for, in accordance with a result of the detection by the operation status detecting unit, when any of the storing units goes down, executing regeneration of the fragment data having been stored in the down storing unit based on other of the fragment data stored in another of the storing units different from the down storing unit, and storing into the other of the storing units, and transferring and storing the fragment data stored in the storing unit previously scheduled to go down into another of the storing units before the storing unit goes down, wherein based on operation schedule data in which it is previously set the storing unit goes down, the data regenerating unit transfers and stores the fragment data stored in the storing unit into another of the storing units before the storing unit goes down and, when the storing unit scheduled to go down goes down, the data regenerating unit does not execute the regeneration of the fragment data having been stored in the storing unit, wherein when any of the storing units goes down in accordance with an input operation instruction, the data regenerating unit executes a process of the regeneration of the fragment data having been stored in the down storing unit with lower priority than priority set on another process in the storage system, and wherein in a case that the down storage unit does not recover within a preset time during the time of execution of the process of the regeneration of the fragment data stored in the down storing unit with the lower priority, the data regenerating unit executes the process of the regeneration with higher priority than the lower priority.

7. An information processing method in an information processing device that is connected to a plurality of storing units and that stores data into the plurality of storing units and retrieves the data stored in the storing units, the information processing method comprising:

distributing and storing a plurality of fragment data including division data obtained by dividing storage target data into a plurality of pieces and redundant data for restoring the storage target data, into the plurality of storing units;

executing detection of an operation status of each of the storing units; and in accordance with a result of the detection by the operation status detecting units when any of the storing units goes down, executing regeneration of the fragment data having been stored in the down storing unit based on other of the fragment data stored in another of the storing units different from the down storing unit, and storing into the other of the storing units; and the information processing method comprising transferring and storing the fragment data stored in the storing unit previously scheduled to go down into another of the storing units before the storing unit goes down, wherein based on operation schedule data in which it is previously set the storing unit goes down, transferring and storing the fragment data stored in the storing unit into another of the storing units before the storing unit goes down and, when the storing unit scheduled to go down goes down, the data regenerating unit does not execute the regeneration of the fragment data having been stored in the storing unit, wherein when any of the storing units goes down in accordance with an input operation instruction, the regeneration of the fragment data having been stored in the down storing unit is executed with lower priority than priority set on another process in the storage system, and wherein in a case that the down storage unit does not recover within a preset time during the time of execution of the regeneration of the fragment data stored in the down storing unit with the lower priority, the regeneration is executed with higher priority than the lower priority.

* * * * *

UNITED STATES PATENT AND TRADEMARK OFFICE
CERTIFICATE OF CORRECTION

PATENT NO. : 9,652,325 B2  
APPLICATION NO. : 13/522886  
DATED : May 16, 2017  
INVENTOR(S) : Sumudu Dematapitiya Page 1 of 1

It is certified that error appears in the above-identified patent and that said Letters Patent is hereby corrected as shown below:

In the Drawings

Figure 9, Sheet 9, Reference Numeral S3, Line 3:
"[S" has been replaced with --IS--

Figure 9, Sheet 9, Reference Numeral S4, Line 1:
"[S" has been replaced with --IS--

In the Specification

Column 6, Line 37:
"controlling" has been replaced with --processing--

Column 6, Line 45-46:
"controlling" has been replaced with --processing--

Column 7, Line 44:
"20." has been replaced with --10.--

Signed and Sealed this
Twentieth Day of March, 2018

Andrei Iancu
*Director of the United States Patent and Trademark Office*